United States Patent [19]
Yamamoto et al.

[11] Patent Number: 5,617,229
[45] Date of Patent: Apr. 1, 1997

[54] FIELD SEQUENTIAL FERROELECTRIC LCD HAVING A SINGLE CRYSTALLINE LAYER IN WHICH A PLURALITY OF CIRCUIT ELEMENTS ARE FORMED

[75] Inventors: Yoshitaka Yamamoto, Yamatokoriyama, Japan; Akira Tagawa, Oxford, United Kingdom; Yutaka Ishii, Nara, Japan; Mitsuhiro Koden, Nara, Japan; Tokihiko Shinomiya, Nara, Japan

[73] Assignee: Sharp Kabushiki Kaisha, Osaka, Japan

[21] Appl. No.: 294,818

[22] Filed: Aug. 25, 1994

[30] Foreign Application Priority Data

Aug. 27, 1993 [JP] Japan ................... 5-212674

[51] Int. Cl.⁶ ............ G02F 1/136; G02F 1/1347; G02F 1/1335; G02F 1/1333
[52] U.S. Cl. ............... 349/42; 349/78; 349/106; 349/158; 349/172
[58] Field of Search ................... 359/55, 56, 75, 359/82, 59, 53, 98, 66, 100

[56] References Cited

U.S. PATENT DOCUMENTS

| | | | |
|---|---|---|---|
| 4,367,924 | 1/1983 | Clark et al. | 359/56 |
| 4,726,659 | 2/1988 | Conrad et al. | 359/75 |
| 4,882,207 | 11/1989 | Coates et al. | 359/75 |
| 5,020,883 | 6/1991 | Era et al. | 359/75 |
| 5,046,823 | 9/1991 | Mori et al. | 359/56 |
| 5,132,811 | 7/1992 | Iwaki et al. | 359/72 |
| 5,194,974 | 3/1993 | Hamada et al. | 359/59 |
| 5,339,090 | 8/1994 | Crossland et al. | 345/90 |
| 5,347,378 | 9/1994 | Handschy et al. | 359/53 |

FOREIGN PATENT DOCUMENTS

| | | |
|---|---|---|
| 56-107216 | 8/1981 | Japan . |
| 3-242624 | 10/1991 | Japan . |

OTHER PUBLICATIONS

Nito et al, "A Novel Surface–Stabilized Monostable Ferroelectric LCD", Journal of the SID, 1/2, 1993, pp. 163–169.
Clark et al, "Submicrosecond Bistable Electro–Optic Switching in Liquid Crystals", Appl. Phys. Lett. 36(11), Jun. 1980, pp. 899–901.
Schadt, "Short–Pitch Bistable Ferroelectric LCDs", SID 90 Digest, 1990, pp. 106–107.

*Primary Examiner*—William L. Sikes
*Assistant Examiner*—Walter J. Malinowski
*Attorney, Agent, or Firm*—Nixon & Vanderhye P.C.

[57] ABSTRACT

A liquid crystal display device includes: a first substrate having a single-crystalline silicon layer on one surface thereof; a transparent second substrate disposed opposite the first substrate, the surface of the first substrate having the single-crystalline silicon layer thereon facing the second substrate with a ferroelectric liquid crystal layer sandwiched therebetween; and a plurality of circuit elements formed in the single-crystalline silicon layer in a corresponding relationship to each of a plurality of pixel areas formed on the surface of the first substrate which faces the ferroelectric liquid crystal layer.

5 Claims, 21 Drawing Sheets

FIG.1A
SUBSTRATE        SUBSTRATE
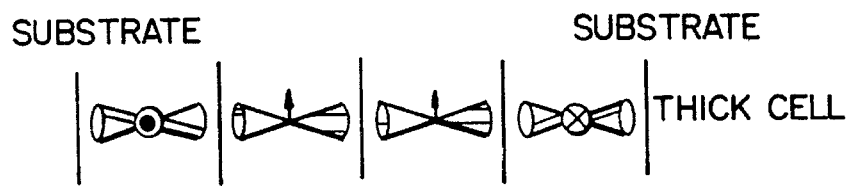 THICK CELL
FIG. 1B
⇩ SUPPRESSING HELICAL STRUCTURE
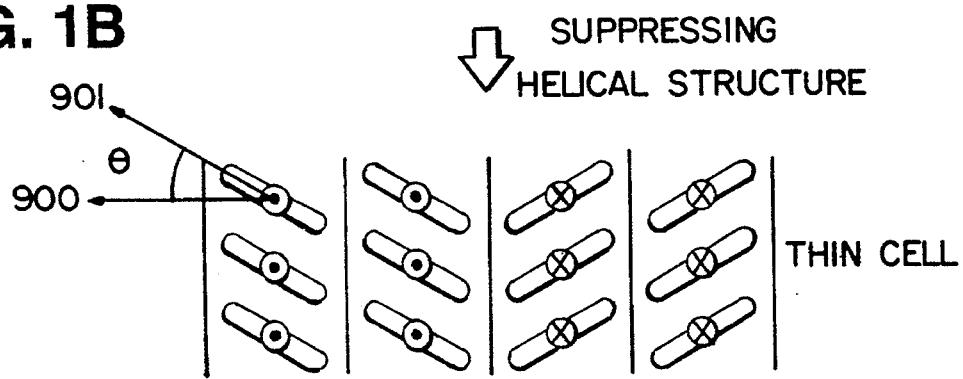 THIN CELL
FIG. 1C
⇩ APPLYING A VOLTAGE ⊙
DARK
FIG. 1D
⇩ CHANGING A POLARITY ⊗
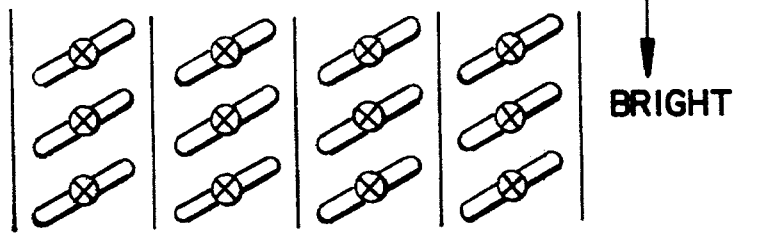
HIGH SPEED RESPONSE
BRIGHT
FIG. 1E
⇩ REMOVING A VOLTAGE
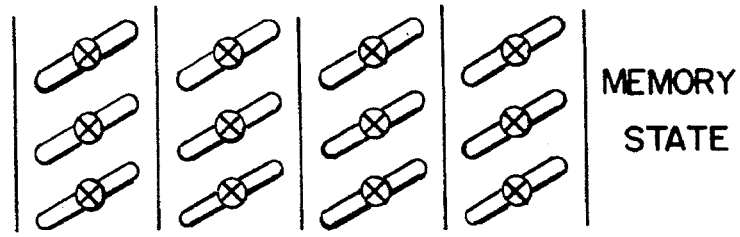 MEMORY STATE

FIG. 13A
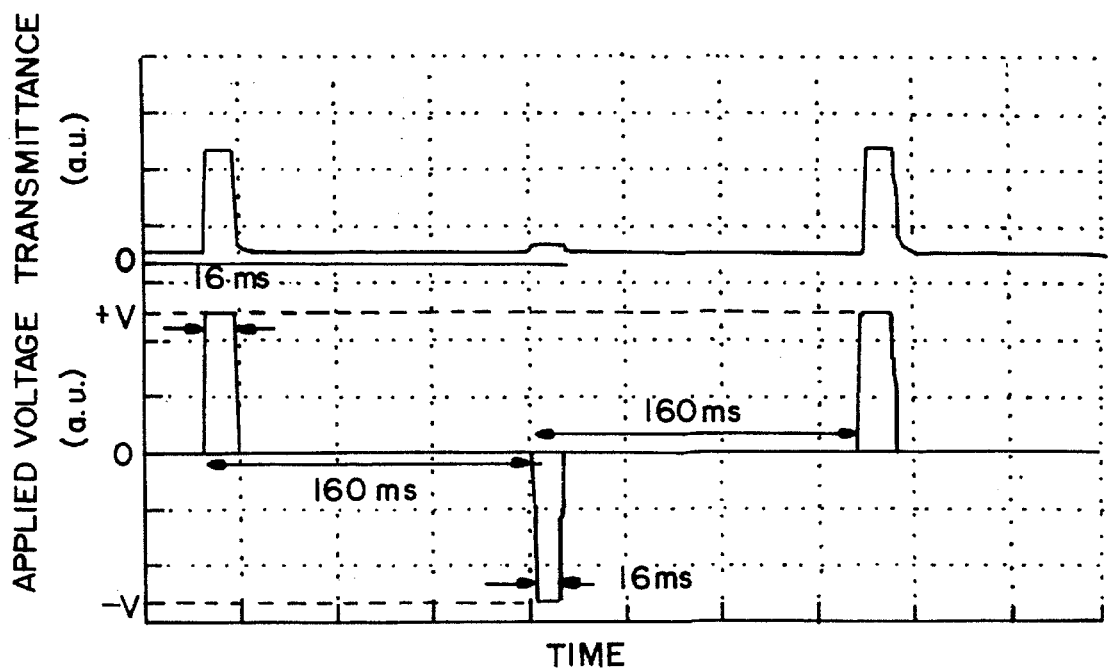
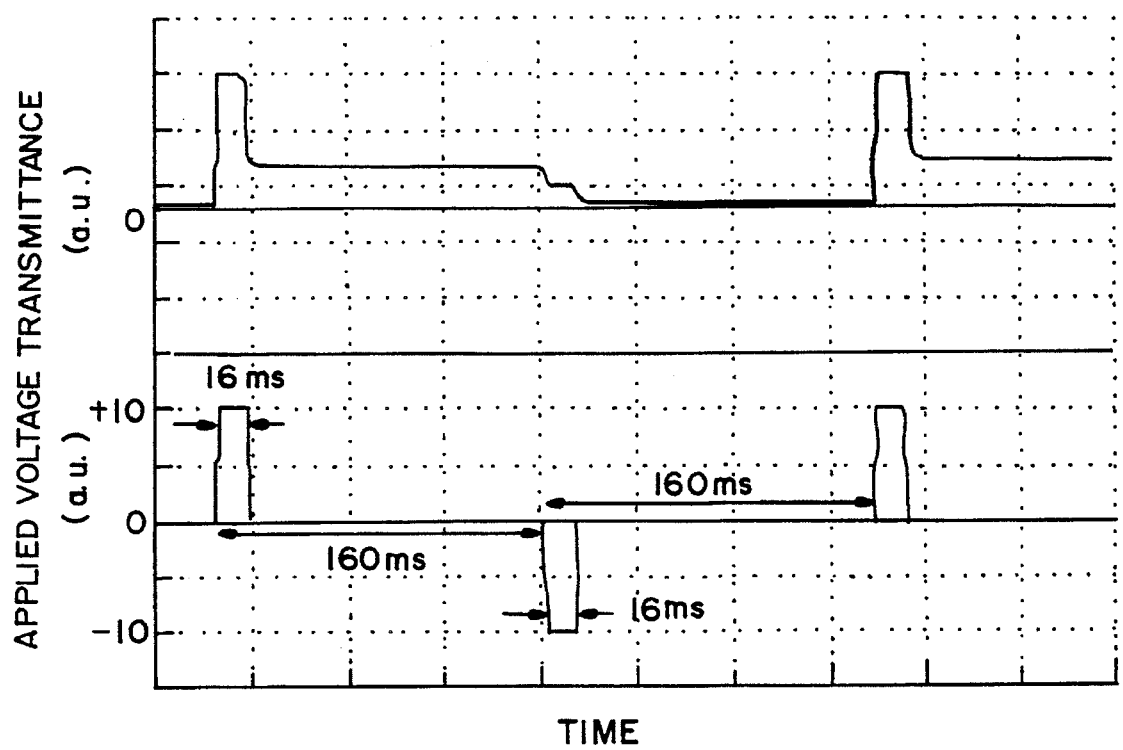
FIG. 13B

FIELD SEQUENTIAL FERROELECTRIC LCD HAVING A SINGLE CRYSTALLINE LAYER IN WHICH A PLURALITY OF CIRCUIT ELEMENTS ARE FORMED

BACKGROUND OF THE INVENTION

1. Field of the Invention

The present invention relates to a liquid crystal display device. More particularly, the invention relates to a high-resolution, high-brightness liquid crystal color display device based on a field sequential system and a driving method for the same.

2. Description of the Related Art

Liquid-crystal display devices (hereinafter abbreviated LCDs) have found widespread commercial applications in a variety of fields ranging from calculators to portable television sets (hereinafter abbreviated TVs) because of their excellent display performance rivaling that of the cathode ray tube (CRT herein after), their space-saving features exemplified by thin and light-weight construction, and other useful features such as low power consumption. While there are problems yet to be resolved, especially in response time and viewability, various improvements have been made in LCD technology because the LCD is a promising display device that is expected to replace the CRT in the near future. Among such improvements, improvements in color LCD technology involve various aspects of display performance and assume an important position in the development of the technology.

The principle of a color display is based on the method called "additive color mixing process". When two or more colored light beams enter the human eye, the light beams are combined on the retina and perceived as different colors. Based on this principle, any color can be obtained by additively mixing light beams of the three primary colors, R (red), G (green), and B (blue) in appropriate proportions. A color display in practical display devices is implemented using one of two systems based on the principle of the additive color mixing process.

One is the National Television System Committee (NTSC) system that uses a principle called "juxtapositional additive color mixing process". In this system, tiny color filters are placed close together in a matrix array in the display area of a single-plate display panel. These color filters are smaller in area than the spatial resolution limit of the human eye so that a combination of tiny color spots is perceived as a color by the eye. The NTSC system is compatible with monochrome television and currently, is the standard system for use in color TVs. However, in this "juxtapositional additive color mixing process", the R, G, and B primary colors become visible as separate colors unless the pixel size is smaller than the spatial resolution limit of the human eye. The juxtapositional additive color mixing process therefore poses a problem in that it reduces image quality when it is employed in a projection LCD or the like which projects an enlarged image for display.

The other system is one that employs a "simultaneous additive color mixing process". To apply this system for a color LCD, three color filters of R, G, and B are used in combination with three LCD panels, and three color images are simultaneously projected onto a screen where the color images are superimposed and merged into one color image. This system eliminates the fabrication difficulty of tiny color filters which is required in the Juxtapositional additive color mixing process. However, if there is a defective pixel in any of the three LCD panels, one of the R, G, and B colors, or a mixed color thereof, appears as a bright spot at the affected pixel position, thus making the defect noticeable. Furthermore, the provision of three LCD panels leads to increased size and cost of the display system.

Color LCDs have the above-mentioned shortcomings. In addition for the demand to overcoming these shortcomings, there is an increasing demand to enhance the resolution and brightness of color LCDs, which is imperative among others in the implementation of high-definition TV as the next-generation visual medium.

Higher resolution and higher brightness are conflicting requirements. On one hand, increasing the pixel density for increased resolution increases the ratio of the switching element area to the pixel area, which results in a reduction in the aperture ratio and consequently, a reduction in brightness. Conversely, if the aperture ratio is to be increased, the pixel area must be increased, which reduces the resolution. While the NTSC system is the standard system for color television today, the field sequential color system has now received renewed attention as a color system to overcome the above problems, for the reasons hereinafter described. The field sequential color system provides the following advantages in terms of high resolution and high brightness characteristics.

(1) The field sequential system uses a principle called "successive additive color mixing process". This process utilizes the resolution limit of the human eye in the time domain. More specifically, this process utilizes the phenomenon that when successive color changes are too fast for the human eye to perceive, the persistence of the previous color causes the color to be mixed with the succeeding color and these colors are combined and perceived as one color to the human eye. As in the simultaneous additive color mixing process, any desired color can be obtained at each pixel, so that the system achieves high image definition and also provides excellent color reproduction. The first color TV standard system utilized the field sequential system.

(2) If there is a defective pixel in the LCD panel, the affected pixel appears as black or white, which is not as noticeable as a colored bright spot. Therefore, pixel defects, up to a certain degree, will not lead to image quality reduction.

(3) Full-color or multi-color images can be displayed using a single LCD panel, which serves to reduce the size and weight of the display system. No cost increase is involved since no more than one LCD panel is required, unlike the simultaneous additive color mixing process which requires the provision of more than one LCD panel.

Color technology based on the field sequential system will be described below. FIG. 19 shows a color filter plate capable of high-speed sequential switching of colors. In the figure, a cyan filter 29C, a magenta filter 29M, and a yellow filter 29Y are formed one on top of another in this order.

The cyan filter 29C includes a pair of transparent substrates 20 and 21 with transparent electrodes (not shown) formed over the entire areas of the opposing surfaces thereof, and a liquid crystal layer 22 including a liquid crystal and cyan dichroic dye, sandwiched between the two substrates 20 and 21.

The magenta filter 29M includes a pair of transparent substrates 23 and 24 with transparent electrodes (not shown) formed over the entire areas of the opposing surfaces thereof, and a liquid crystal layer 25 including a liquid crystal and magenta dichroic dye, sandwiched between the two substrates 23 and 24.

The yellow filter 29Y includes a pair of transparent substrates 26 and 27 with transparent electrodes (not shown) formed over the entire areas of the opposing surfaces thereof, and a liquid crystal layer 28 including a liquid crystal and yellow dichroic dye, sandwiched between the two substrates 26 and 27.

The cyan filter 29C, magenta filter 29M, and yellow filter 29Y are each supplied with an AC voltage from an AC power supply 31, via their associated switching circuits 30C, 30M, and 30Y, respectively. Based on a select signal supplied from a display control circuit 16, the switching circuits 30C, 30M, and 30Y selectively apply the AC voltage to the cyan filter 29C, magenta filter 29M, and yellow filter 29Y, to drive the respective filters.

By controlling the activation and deactivation of each filter in this manner, light beams of the three primary colors, i.e., a red colored light beam, a green colored light beam, and a blue colored light beam are produced. Table 1 below shows the combinations in which the filters are turned on or off, in relationship to the resulting colors of incident light beam.

TABLE 1

| Combination | | | Resulting |
|---|---|---|---|
| 29C | 29M | 29Y | colors |
| ON | OFF | OFF | Red |
| OFF | ON | OFF | Green |
| OFF | OFF | ON | Blue |

The operation of the field sequential color system using the above color filters will be described in detail below. FIG. 20 shows a timing chart for explaining the basic operation of a light beam selecting element 15. As shown, a voltage is applied to the cyan filter 29C during the period from time t1 to time t3. The orientation of the liquid crystal does not change immediately upon voltage application, but it takes a prescribed transition period $\tau$. The transition period $\tau$ corresponds to the response time of the liquid crystal molecules to the applied electric field. Accordingly, even if voltage application is started at time t1, the liquid crystal in the cyan filter 29C does not immediately change the orientation in response to the applied voltage and the changed orientation does not settle down until time t2, i.e., until after the transition period $\tau$ has elapsed. As a result, the light beam selecting element 15 transmits a red colored light beam during a period TR starting at time t2 and lasting until time t3.

In like manner, voltage is applied to the magenta filter 29M, yellow filter 29Y, and cyan filter 29C in sequence, the light beam selecting element 15 transmitting a green colored light beam, blue colored light beam, and red colored light beam, respectively.

The light beam selecting element is not limited to the illustrated construction. It will be recognized that there are other possible constructions that can produce a desired color. For example, a construction including three kinds of liquid crystals containing red, blue, and green dichroic dyes, a construction including a liquid crystal panel combined with color polarizers, or a construction including a liquid crystal panel combined with neutral polarizers may be used.

Color technology based on the field sequential system has been described above. As described earlier, according to the field sequential system, a high-resolution, high-brightness color LCD having excellent image display quality can be achieved with a compact and light-weight construction.

However, LCD implementation of color display based on the field sequential system demands the following.

(1) Increased LCD response speed and stability of signal retention.

(2) Increased operating speed of switching elements.

Description is first given of (1) the increased LCD response speed and the stability of signal retention. FIG. 21 shows the equivalent circuit of a conventional liquid crystal driving circuit for each unit pixel in an active-matrix liquid crystal display device constructed with thin-film transistors (hereinafter abbreviated TFTs). The driving circuit shown includes a TFT 103, a pixel electrode 107, a liquid crystal capacitor LC, a counter electrode 108, and an additional capacitor Cs. The TFT 103 has a gate electrode 104 connected to a scanning line 101, a source electrode 105 connected to a data line 102, and a drain electrode 106 connected to the pixel electrode 107 and the additional capacitor Cs. A data signal corresponding to an image to be displayed is applied to the data line 102, and the signal is written to the pixel when the pixel is selected by applying a scanning signal to its associated scanning line 101. More specifically, when a scanning signal is applied to the scanning line 101, the TFT 103 connected to the scanning line 101 is turned on to selectively drive the pixel electrode 107. A voltage is applied between the selected pixel electrode 107 and the counter electrode 108, and the data signal is written as an electric charge on the liquid crystal capacitor LC between the two electrodes 107 and 108 as well as on the additional capacitor Cs.

In a display device having the liquid crystal driving circuitry as described above, if the minimum frame switching frequency at which the flicker is not perceivable by the human eye is 30 Hz or more, it follows that images in the R, G, and B primary colors must be displayed successively within 1/30 second, which is one frame period, in order to achieve full color display in accordance with the field sequential color system. These three images are merged using the retentivity of the human eye and as a result perceived as a full-color image. More specifically, if the display frequency is 30 Hz, then the images in the R, G, and B primary colors must each be displayed at a frequency of 90 Hz, which means that the LCD must display each color image in about 11 milliseconds. The LCD must be capable of displaying a good quality image within this period. This also means that the stored data signal must be retained in a stable state during the 11-millisecond period. Furthermore, to display 1125 scanning lines used in the High-Vision system, an extremely fast response is required. That is, a scanning signal must be applied to every one scanning line in about 10 microseconds.

Next, description is given of (2) the increased operating speed of the switching elements that is required of the liquid crystal driving circuitry employing the field sequential color system.

To produce images for ordinary High-Vision broadcasts, 1125 scanning lines and 1875 data lines are needed. In this case, the operating speed of about 102 KHz is required to the switching elements in the driving circuit for driving the scanning lines, and the operating speed about 190 MHz or more is required to the switching elements in the driving circuit for driving the data lines.

Thus, very fast switching elements are needed to implement the color display according to the field sequential system.

Materials for switching elements required to achieve such high-speed switching operations will be described below.

Liquid-crystal display devices usually use glass substrates. In active-matrix LCDs, switching elements such as TFTs are formed on such glass substrates. The characteristics of TFTs are determined by the kinds of thin films used to form the TFTs. The materials commonly used for the thin films are generally classified into one of the following three categories.

(1) Amorphous silicon (2) Low-temperature polysilicon (3) High-temperature polysilicon Explanation will be given below of the thin films formed of the respective materials.

(1) Since amorphous silicon thin films can be formed at a relatively low temperature of about 350° C., these thin films can be formed on a low-cost glass substrate, for example, a substrate made of Corning 7059 manufactured by Corning Ltd. However, ordinary low-cost glass cannot be subjected to temperatures of not lower than 600° C. Therefore, a thermal oxide film having high insulating strength and high resistance to pinhole formation cannot be grown on a substrate made of such glass. In addition, there are many trapping states in an amorphous silicon thin film. For instance, the field-effect mobility μe of an amorphous silicon thin film is about 0.1 to 0.5 $cm^2V^{-1}S^{-1}$. Accordingly, amorphous TFTs formed on a low-cost glass substrate have a large ON resistance, which means that circuits, such as driver circuits, requiring complex and high-performance transistors cannot be fabricated on the same substrate as the display part.

(2) Low-temperature polysilicon is crystallized by long-period annealing or laser annealing. The maximum processing temperature is 550° to 600° C. Since polysilicon TFTs are formed at higher temperatures than amorphous silicon TFTs, polysilicon TFTs generally have good transistor characteristics. That is, the field-effect mobility μe (electron mobility) is about 50 $cm^2V^{-1}S^{-1}$, and μh (hole mobility) is about 15 $cm^2V^{-1}S^{-1}$.

(3) Since high-temperature polysilicon can be processed at temperatures as high as 1200° C. when formed on a quartz substrate having excellent heat resistance, TFTs formed of high-temperature polysilicon have the best characteristics among the three categories of TFTs. A field-effect mobility μe of about 100 $cm^2V^{-1}S^{-1}$ can be obtained. Since TFTs having better characteristics than amorphous TFTs can be obtained, polysilicon thin films have the advantage that an IC fabrication process can be used for thin film fabrication and that some of driving circuits can be formed on the same glass substrate as the display part.

However, transistors formed of polysilicon, not to mention transistors formed of amorphous silicon, are slow with respect to operating speed. When the maximum operating frequencies are measured, for example, on CMOS shift registers formed from TFTs, the results are typically 5 MHz for low-temperature polysilicon TFTs, and 15 MHz even for high-temperature polysilicon TFTs. These operating speeds are slower than those needed to realize a color LCD based on the field sequential system. Therefore, TFTs capable of higher operating speeds are in high demand. Furthermore, since polysilicon TFTs have relatively large leakage currents, the TFT size has to be increased to provide a larger on/off ratio, or TFTs have to be connected in series. This makes the reduction of the LCD size difficult.

SUMMARY OF THE INVENTION

The liquid crystal display device of the present invention includes: a first substrate having a single-crystalline silicon layer on one surface thereof; a transparent second substrate disposed opposite the first substrate, the surface of the first substrate having the single-crystalline silicon layer thereon facing the second substrate with a ferroelectric liquid crystal layer sandwiched therebetween; and a plurality of circuit elements formed in the single-crystalline silicon layer in a corresponding relationship to each of a plurality of pixel areas formed on the surface of the first substrate which faces the ferroelectric liquid crystal layer.

In one embodiment of the present invention, the ferroelectric liquid crystal layer includes a ferroelectric liquid crystal of chiral smectic phase, a helical structure of the chiral smectic phase having a pitch smaller than a gap between the first and the second substrates, with resulting suppression of the helical structure.

In another embodiment of the present invention, an alignment film made of an organic polymer is formed over at least one of the surfaces of the first and the second substrates which face the ferroelectric liquid crystal layer, the alignment film being treated with rubbing.

In still another embodiment of the present invention, alignment films are formed on the first and second substrates, and the rubbing treatment is carried out only on the alignment film formed on the second substrate.

In still another embodiment of the present invention, the ferroelectric liquid crystal has only one stable orientation state in the absence of an applied electric field.

In still another embodiment of the present invention, alignment films are formed on the first and second substrates, the alignment film formed on the first substrate is made of a different material from the alignment film formed on the second substrate.

In still another embodiment of the present invention, the alignment film formed on the first substrate and the alignment film formed on the second substrate are treated using different alignment treatment conditions.

In another aspect of the present invention, a driving method for a liquid crystal display device is provided. The liquid crystal display device includes: a first substrate having a single-crystalline silicon layer on one surface thereof, a transparent second substrate disposed opposite the first substrate, the surface of the first substrate having the single-crystalline silicon layer thereon facing the second substrate with a ferroelectric liquid crystal layer sandwiched therebetween, a plurality of circuit elements formed in the single-crystalline silicon layer in a corresponding relationship to each of a plurality of pixel areas formed on the surface of the first substrate which faces the ferroelectric liquid crystal, and a power supply connected to the circuit elements. In the driving method, the ferroelectric liquid crystal layer is placed in one memory state by applying an electric field from the power supply via the circuit elements and a gray scale generation signal is applied to the ferroelectric liquid crystal layer while varying the level of the signal, thereby accomplishing the generation of gray scales.

In one embodiment of the present invention, the ferroelectric liquid crystal has only one stable orientation state in the absence of an applied electric field.

In another embodiment of the present invention, one complete image is scanned for display within 11 milliseconds.

In another aspect of the present invention, a driving method for a liquid crystal is provided. The liquid crystal display device includes:

a first substrate having a single-crystalline silicon layer on one surface thereof, a transparent second substrate disposed opposite the first substrate, the surface of the first substrate having the single-crystalline silicon layer thereon facing the second substrate with a ferroelectric liquid crystal layer sandwiched therebetween, scanning lines and signal lines formed in the single-crystalline silicon layer in such a manner as to form a matrix, a first switching element, a second switching element, and a storage capacitor formed in the single-crystalline silicon layer in each of a plurality of pixel areas formed in the matrix, a pixel electrode deposited on a protective film formed over the entire surface of the single-crystalline silicon layer of the first substrate and covering the scanning lines, the signal lines, the first switching element, the second switching element, and the storage capacitor, the pixel electrode being provided in each of the plurality of pixel areas, with the first switching element being connected to the associated scanning line and signal line as well as to one electrode of the storage capacitor and the second switching element, and the second switching element being connected to the one electrode of the storage capacitor and the pixel electrode, and a transparent counter electrode deposited on the surface of the second substrate facing the first substrate.

In the driving method for the liquid crystal display device, when a scanning signal is applied to the first switching element through the scanning line to turn on the first switching element, a data signal is applied to the second switching element through the first switching element to turn on the second switching element, thereby applying a voltage across a region of the ferroelectric liquid crystal layer between the pixel electrode connected to the second switching element and the transparent counter electrode corresponding to the pixel electrode, and thus holding that region at a prescribed potential while, at the same time, retaining the data signal in the storage capacitor, and during the OFF period of the first switching element, the second switching element is held ON using the data signal retained in the storage capacitor during the ON period of the first switching element, thereby allowing a voltage from the power supply to be applied across the ferroelectric liquid crystal between the pixel electrode and the transparent counter electrode so that the ferroelectric liquid crystal layer is held at the substantially same potential as when the first switching element is ON.

Thus, the invention described herein makes possible the advantages of (1) providing a liquid crystal color display device based on the field sequential system, and (2) providing a driving method for the same.

These and other advantages of the present invention will become apparent to those skilled in the art upon reading and understanding the following detailed description with reference to the accompanying figures and tables.

BRIEF DESCRIPTION OF THE DRAWINGS

FIGS. 1A to 1E are schematic diagrams illustrating the bistability of ferroelectric liquid crystal molecules.

FIGS. 13A and 13B show diagrams showing the intensity of transmitted light as a function of the applied voltage for monostable and bistable ferroelectric liquid crystals, respectively.

DESCRIPTION OF THE PREFERRED EMBODIMENTS

Figure 2A:
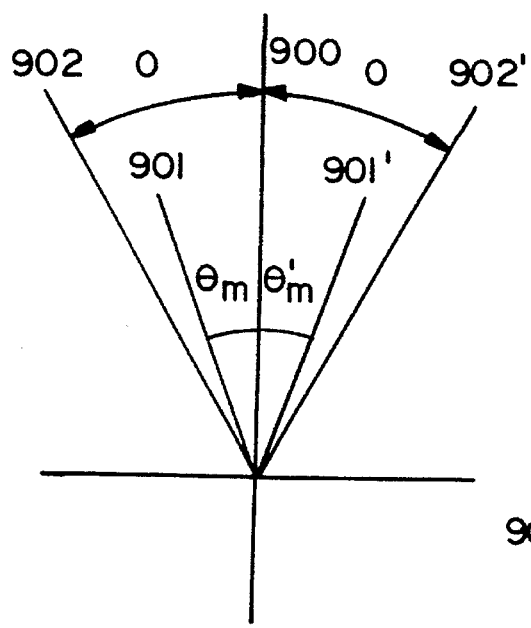
FIGS. 2A, 2B and 2C are diagrams for explaining the principle of gray scale generation in a ferroelectric liquid crystal display device.

Hereinafter, the present invention will be described by way of illustrative examples with reference to the drawings and tables.

In the liquid crystal display device according to the present invention, since a ferroelectric liquid crystal is used as the liquid crystal material, a fast response can be obtained. Further, the ferroelectric liquid crystal display device of the invention uses the display mode in which the transmittance varies continuously with applied voltage in a stable state. This makes it possible to display gray scales.

Since a single-crystalline silicon substrate is used as the base substrate and switching transistors are formed in a single-crystalline silicon layer, the switching transistors have large current-driving capabilities, small size and are capable of high speed switching operations.

Since the single-crystalline layer allows increased packing density of circuit elements, two transistors and a storage capacitor are provided for each unit pixel area in the invention. The first transistor is connected to a scanning line and a signal line. The drain of the first transistor is connected to one electrode of the storage capacitor as well as to the second transistor. The other electrode of the storage capacitor is grounded. The second transistor is also connected to a power supply and a pixel electrode.

The first transistor applies a data signal to the second transistor. The storage capacitor has the function of storing the data signal from the first transistor. The second transistor is a switching transistor for applying the data signal voltage from the power supply to the liquid crystal when the first transistor is ON. This second transistor continues to apply a voltage corresponding to the data signal stored on the storage capacitor, to the liquid crystal after the first transistor is turned off, until the first transistor is turned on again.

The ferroelectric liquid crystal exhibits a spontaneous polarization; when a voltage is applied, a transient current flows due to a change in the molecular orientation of the liquid crystal. As for the time required to write data to the scanning lines, if a total of 1125 scanning lines are to be scanned in 1/30 second, the write time allowed for one scanning line is about 10 microseconds to implement the field sequential color system. The change of the molecular orientation in the ferroelectric liquid crystal takes several tens of microseconds, which means that the transient current flows for a period longer than the write time. According to the above-described construction of the invention, since the voltage corresponding to the data signal stored on the storage capacitor continues to be applied to the liquid crystal during one field period, the transient current does not affect the liquid crystal potential.

Examples

An example of the present invention will be described below. In LCD applications where a particularly clear display is required, active-matrix LCDs having switching transistors or the like at each pixel location are used. A typical display mode used in active-matrix LCDs is the twisted nematic mode (herein-after abbreviated TN mode). In the TN mode, the liquid crystal molecules in the liquid crystal cell are initially twisted nearly 90°; the liquid crystal cell is placed between a pair of polarizers, and display is produced by utilizing the optical properties of the cell, i.e, the optical rotatory power in the absence of an electric field and cancellation of the optical rotatory power under the influence of an applied field.

While the field-effect nematic liquid crystal display devices utilize the dielectric anisotropy of liquid crystal molecules, ferroelectric liquid crystal display devices produce display by utilizing the property that the ferroelectric liquid crystal molecules possess a spontaneous polarization and switch in such a manner that the polarity of their spontaneous polarization matches the polarity of an applied electric field. Display devices using ferroelectric liquid crystals are described, for example, in N. A. Clark and S. T. Lagerwall, Appl. Phys. Lett., 36, 899 (1980), Japanese Laid-Open Patent Publication No. 56-107216, and U.S. Pat. No. 4,367,924. FIGS. 1A to 1E show schematic diagrams illustrating the spontaneous polarization in the ferroelectric liquid crystal and associated elec- tro-optic effects. The liquid crystal molecules in the ferroelectric liquid crystal layer are oriented in a helical structure as shown in FIG. 1A. When the ferroelectric liquid crystal is filled into a cell whose thickness is smaller than the helical pitch, the helical structure is suppressed and two stable states result. To produce a ferroelectric liquid crystal cell having bistable states by suppressing the helical structure, Japanese Laid-Open Patent Publication No. 56-107216 and U.S. Pat. No. 4,367,924 propose methods wherein the helical structure is suppressed by making the helical pitch larger than the cell thickness. These methods utilize the strong property of the liquid crystal molecules to align parallel with the substrate interface. Such a ferroelectric liquid crystal cell is called a surface stabilized ferroelectric liquid crystal cell (SSFLC cell). In FIG. 1B, the reference numeral 900 designates the normal to the smectic layer, and 901 indicates the direction of the long axis of the ferroelectric liquid crystal molecule (orientation direction). The angle between 900 and 901 is the tilt angle $\theta$ of the liquid crystal molecule. By applying an electric field across the ferroelectric liquid crystal, as shown in FIG. 1C, the spontaneous polarization of the ferroelectric liquid crystal molecules can be oriented in the direction of the electric field. By changing the polarity of the applied field, as shown in FIG. 1D, the orientation state of the liquid crystal molecules can be switched from one state to the other. Even after the applied voltage is removed, the orienting directions of the molecular axes in the respective states can be retained, as shown in FIG. 1E. This is the memory effect, one of the electro-optic effects exhibited by the ferroelectric liquid crystal.

The switching between the two states changes the birefringence of the ferroelectric liquid crystal layer in the cell. Therefore, with the ferroelectric liquid crystal cell sandwiched between two polarizers, transmission of light passing through it can be controlled. Since the spontaneous polarization of the liquid crystal and the electric field interact directly to achieve the switching, very fast response times of the order of microseconds can be obtained. In the present example, a ferroelectric liquid crystal of chiral smectic C phase is used in order to achieve a fast-response color LCD based on the field sequential system.

Since the conventional display device using ferroelectric liquid crystal material can only be switched between two states, as described above, gray scales cannot be displayed with such a device. Heretofore, it has generally been believed that an intermediate state between these two stable states cannot be produced.

However, it has recently been found that an intermediate state can be created depending on the condition of the electric field applied to the ferroelectric liquid crystal. More specifically, a voltage of an AC waveform is used and its peak values are varied to generate intermediate states, thereby achieving generation of gray scales. The principle of this gray scale generation will be described in further detail with reference to FIG. 2.

FIG. 2A shows the relationship of the memory angle relative to the tilt angle in the presence of an applied field in a ferroelectric liquid crystal. In the figure, the reference numeral 900 designates the direction of the normal to the smectic layer, and 901 and 901' indicate the orienting directions of the long axes of the ferroelectric liquid crystal molecules in bistable states when no field is applied. Memory angles $\theta_m$ and $\theta_{m'}$ are defined as the angles that the long-axis directions 901 and 901' of the ferroelectric liquid crystal molecules make with the normal 900 to the smectic layer. The reference numerals 902 and 902' in the figure show the apparent long-axis directions of the ferroelectric liquid crystal molecules when a sufficient voltage is applied in positive and negative directions, respectively; the angle between 902 or 902' and 900 is the tilt angle $\theta$ or $\theta'$. As shown, the memory angles $\theta_m$ and $\theta_{m'}$ are normally smaller than the tilt angles $\theta$ and $\theta'$ obtained when a sufficient electric field is applied to the ferroelectric liquid crystal layer. When a voltage is applied across the ferroelectric liquid crystal, the liquid crystal molecules deflect to the right or to the left in the figure, depending on the polarity of the applied voltage. When a sufficiently large voltage is applied, the liquid crystal molecules deflect fully to the position of 902 (or 902'); with a smaller applied voltage, the deflection angle of the liquid crystal molecules stays somewhere between 902 (or 902') and 900.

Figure 2B:
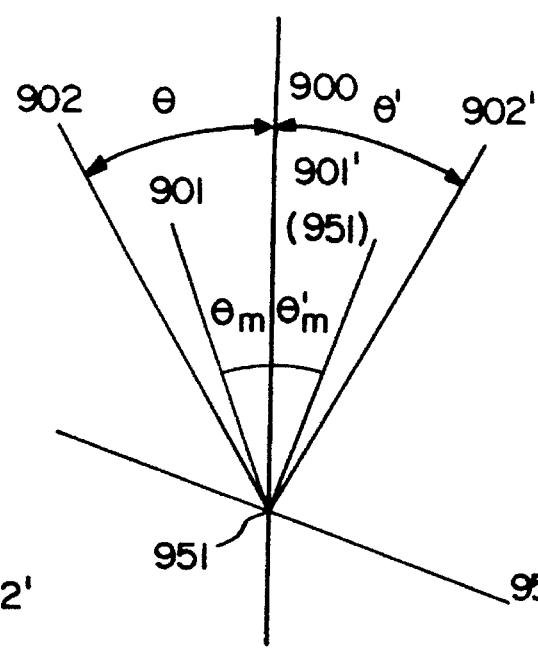

Here, when the ferroelectric liquid crystal layer is sandwiched between two polarizers, with the polarization axis 951 of one polarizer aligned parallel to the long axis direction 901 of one stable state and the polarization axis 952 of the other polarizer aligned at right angles to it, as shown in FIG. 2B, an intermediate state can be created. Using this, gray scales can be achieved.

Next, examples relating to the generation of gray scales by the ferroelectric liquid crystal display device will be described below.

Example 1

First, a pair of glass substrates were used as the substrates for the liquid crystal cell, and a conductive ITO film was deposited and patterned on the surface of each substrate.

Next, an insulating film was formed over the entire surface of each substrate in such a manner as to cover the conductive film.

Then, polyimide PSI-A-2001 (manufactured by Chisso Corporation) was applied over the entire surface of the insulating film by spin coating, which was then treated with rubbing. The pair of glass substrates thus prepared were held opposite each other with their polyimide film sides facing inside and their rubbing directions parallel to each other, and were attached together to provide a cell thickness of 2 μm.

Finally, a ferroelectric liquid crystal mixture 1 was vacuum injected into the empty cell to form the ferroelectric liquid crystal cell. The physical properties of the ferroelectric liquid crystal mixture 1 are shown in Table 2.

TABLE 2

| L.C. compound | Amount |
|---|---|
| $C_9$—⟨phenyl⟩—COO—⟨phenyl⟩—$OC_6$ | 28(%) |
| $C_8O$—⟨phenyl⟩—COO—⟨phenyl⟩—$OC_6$ | 14 |
| $C_8O$—⟨phenyl⟩—COO—⟨phenyl⟩—$OC_4$ | 14 |
| $C_8O$—⟨phenyl⟩—COO—⟨phenyl⟩—$OC_8$ | 12.5 |
| $C_{10}O$—⟨phenyl⟩—COO—⟨phenyl⟩—⟨phenyl⟩—$C_5$ | 9.5 |
| $C_8O$—⟨phenyl⟩—⟨phenyl⟩—⟨phenyl⟩—$C_8$ (with F, F substituents) | 8.5 |
| $C_5O$—⟨phenyl⟩—⟨phenyl⟩—⟨phenyl⟩—$C_8$ (with F, F substituents) | 8.5 |

TABLE 2-continued

| L.C. compound | Amount |
|---|---|
| $C_8$—⟨⟩—⟨⟩—$OCH_2$—*⟨⟩*—$C_3$ 2S,4S CIS (with CN and O, =O groups) | 5 |

Transition temperature $SC^{58}SA^{71}N^{87}I$
$P = -14.5$ nC/cm$^2$ (25 C.)
$\tau = 64$ μsec (±5 V/μm, 25 C. 0–50%)

(*indicates asymmetric carbon)

Figure 3:
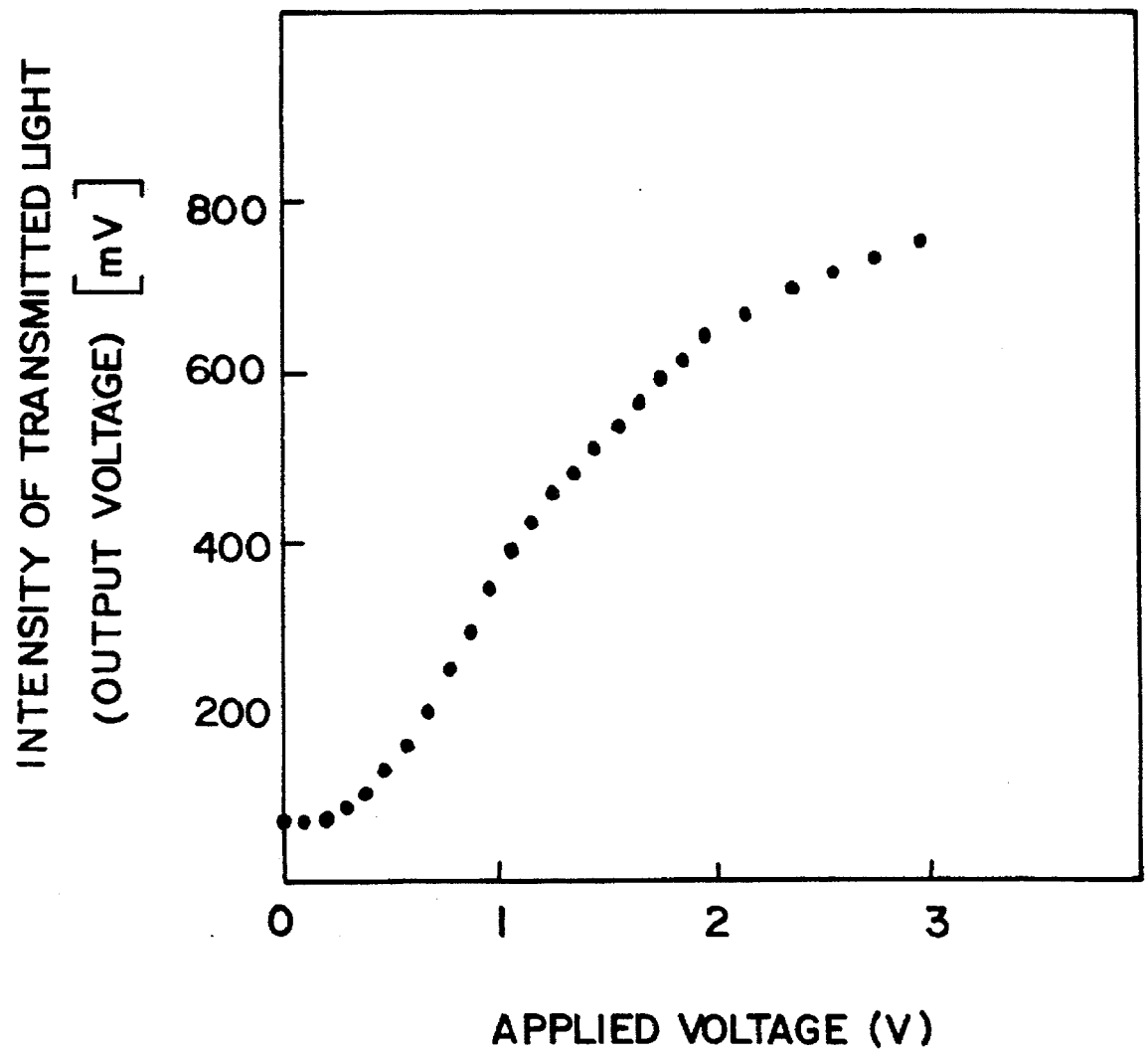
FIG. 3 is a diagram showing the output voltage (the transmittance) as a function of the applied voltage for a ferroelectric liquid crystal.

After placing the ferroelectric liquid crystal in a memory state by applying an electric field, two polarizers were arranged in a crossed Nicols state with one of their polarization axes aligned parallel to one of the extinction directions of the ferroelectric liquid crystal layer. In this situation, the intensity of transmitted light was measured at 25° C. while applying a square wave of 60 Hz. The results of the measurements are shown in FIG. 3. As can be seen from the figure, the transmittance increases continuously with increasing voltage. Continuous gray scales can be achieved using this characteristic. Since the voltage applied to the liquid crystal is balanced between the positive and negative polarities, there is no problem with reliability.

Example 2

First, a pair of glass substrates were used as the substrates for the liquid crystal cell, and a conductive ITO film was deposited and patterned on the surface of each substrate.

Next, an insulating film was formed over the entire surface of each substrate in such a manner so as to cover the conductive film. Then, nylon 66 was applied on the entire surface of the insulating film by spin coating, and only one of the substrates was treated with rubbing. The pair of glass substrates thus prepared were held opposite each other with their nylon 66 sides facing inside, and attached together to provide a cell thickness of 1.2 μm.

Finally, a ferroelectric liquid crystal mixture FLC-6430 (Hoffman-LaRoche) was vacuum injected into the empty cell to form the ferroelectric liquid crystal cell. Physical properties of the ferroelectric liquid crystal mixture are shown in Table 3.

TABLE 3

| Physical properties of FLC-6430 | |
|---|---|
| Spontaneous polarization | 90nC/cm$^2$ |
| Helical pitch | 0.43 μm |
| Tilt angle θ | 27° |
| Memory angle 2θ | 46° |

Figure 4:
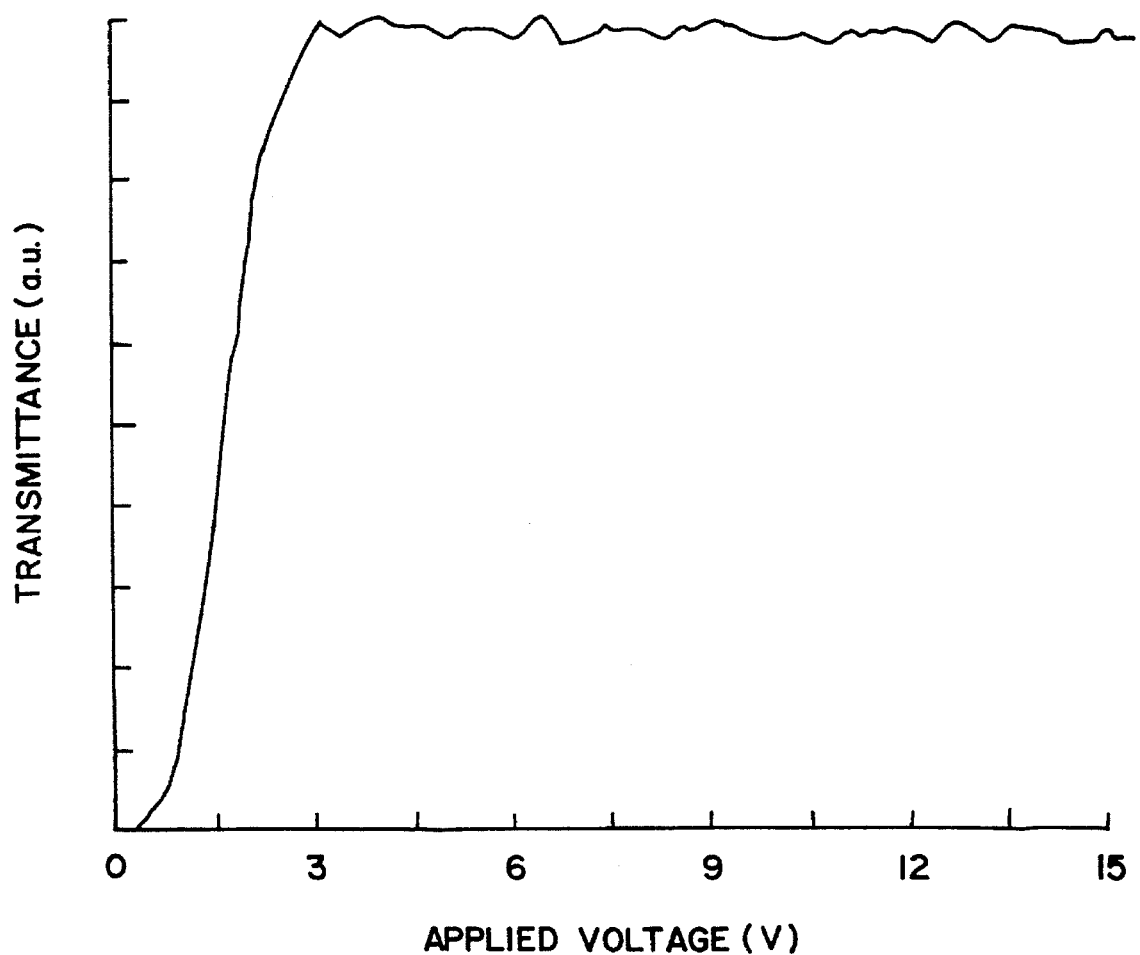
FIG. 4 is a diagram showing the transmittance as a function of the applied voltage for a ferroelectric liquid crystal.

The ferroelectric liquid crystal cell was placed under a polarizing microscope, and the intensity of transmitted light was measured at 20.5° C. while applying a square wave of 60 Hz. The results of the measurements are shown in FIG. 4. As can be seen from the figure, the transmittance increases continuously with increasing voltage.

Example 3

In Example 3, various ferroelectric liquid crystal cells were fabricated in addition to the same ones fabricated in Examples 1 and 2, and the relationships between applied voltage and transmittance, and between applied voltage and response speed were examined for each ferroelectric liquid crystal cell. For each cell, glass substrates were used on both sides, and ITO films were formed and patterned on the opposing surfaces of the substrates. Further, an insulating film and an alignment film were formed in this order to cover the ITO film formed on each of the opposing surfaces of the substrates. The films were not formed for some of the cells. Other test conditions, and test results such as transmittance and response characteristics, are shown in Table 4. In the table "O" indicates the insulation film was formed and "X" indicates the insulation film was not formed.

TABLE 4

Figure 14:
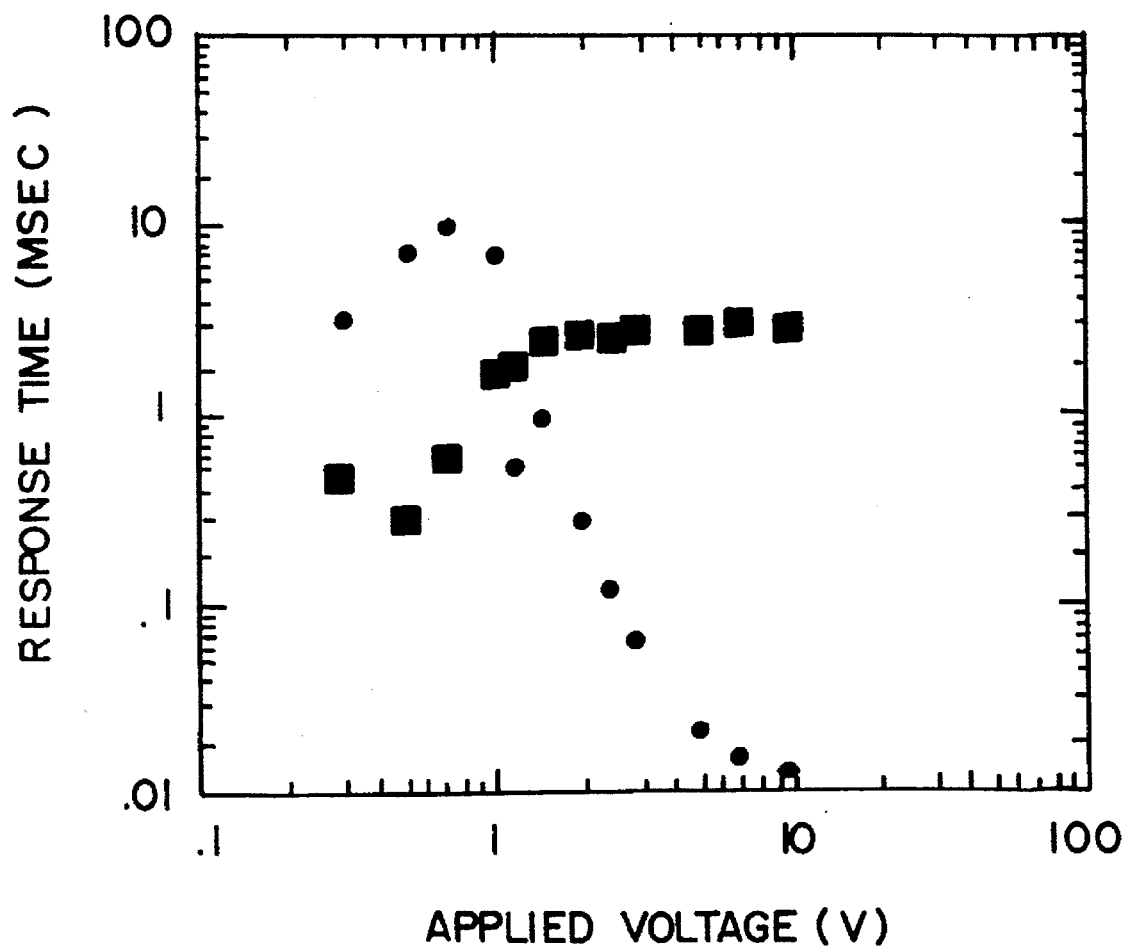
FIG. 14 is a diagram showing the response speed as a function of the applied voltage for a ferroelectric liquid crystal.

| | Upper substrate | | Lower substrate | | | | | | |
|---|---|---|---|---|---|---|---|---|---|
| Cell No. | Insulation film | Alignment film | Insulation film | Alignment film | Rubbing | Liquid crystal | Memory | V-T | Response |
| 1 | o | PSI-S-2001 (Chisso) | o | PSI-S-2001 (Chisso) | Parallel | Mixture No. 1 (Table 2) | Bistable | FIG. 3 | — |
| 2 | o | Nylon 66 | o | Nylon 66 | Upper only | FLC-6430 | Monostable | FIG. 4 | FIG. 14 |

TABLE 4-continued

Figure 5:
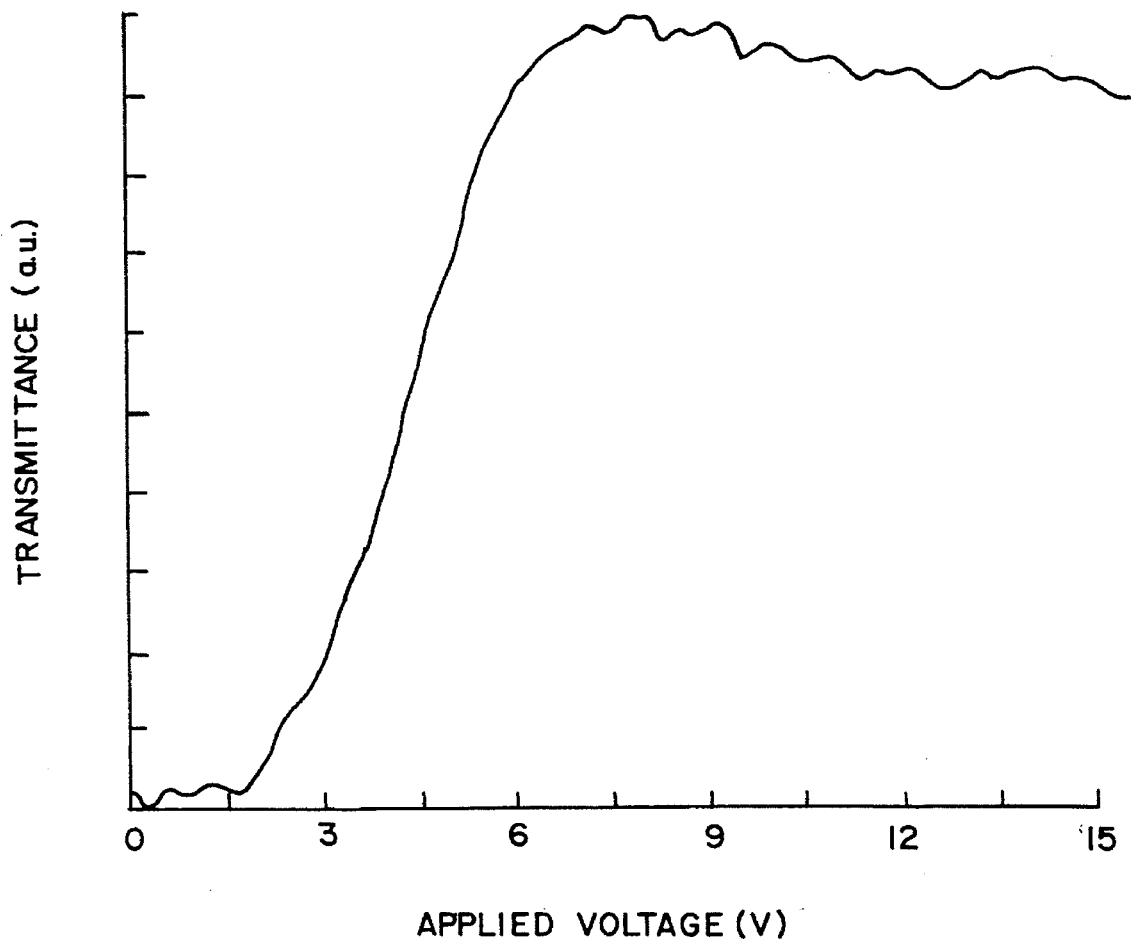
FIG. 5 is a diagram showing the transmittance as a function of the applied voltage for a ferroelectric liquid crystal.
Figure 6:
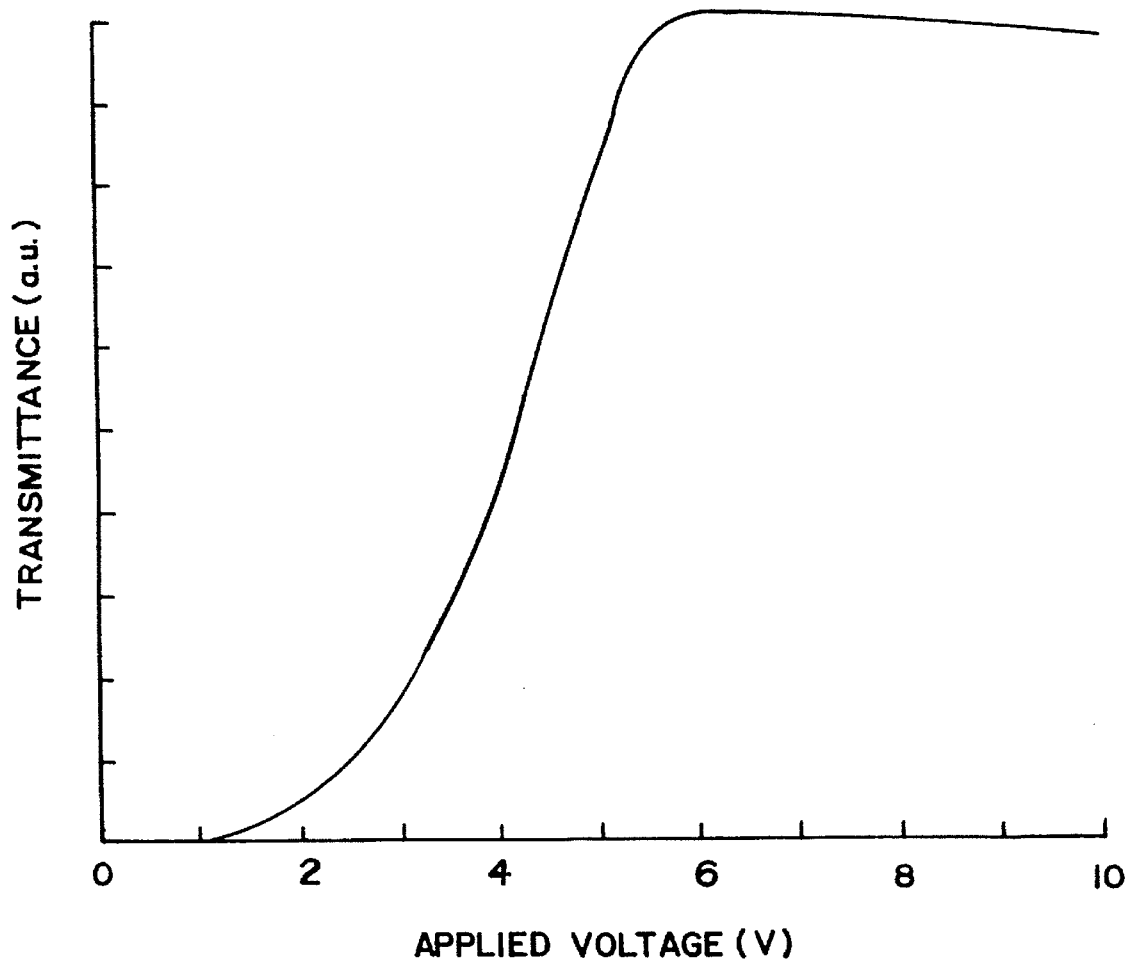
FIG. 6 is a diagram showing the transmittance as a function of the applied voltage for a ferroelectric liquid crystal.
Figure 7:
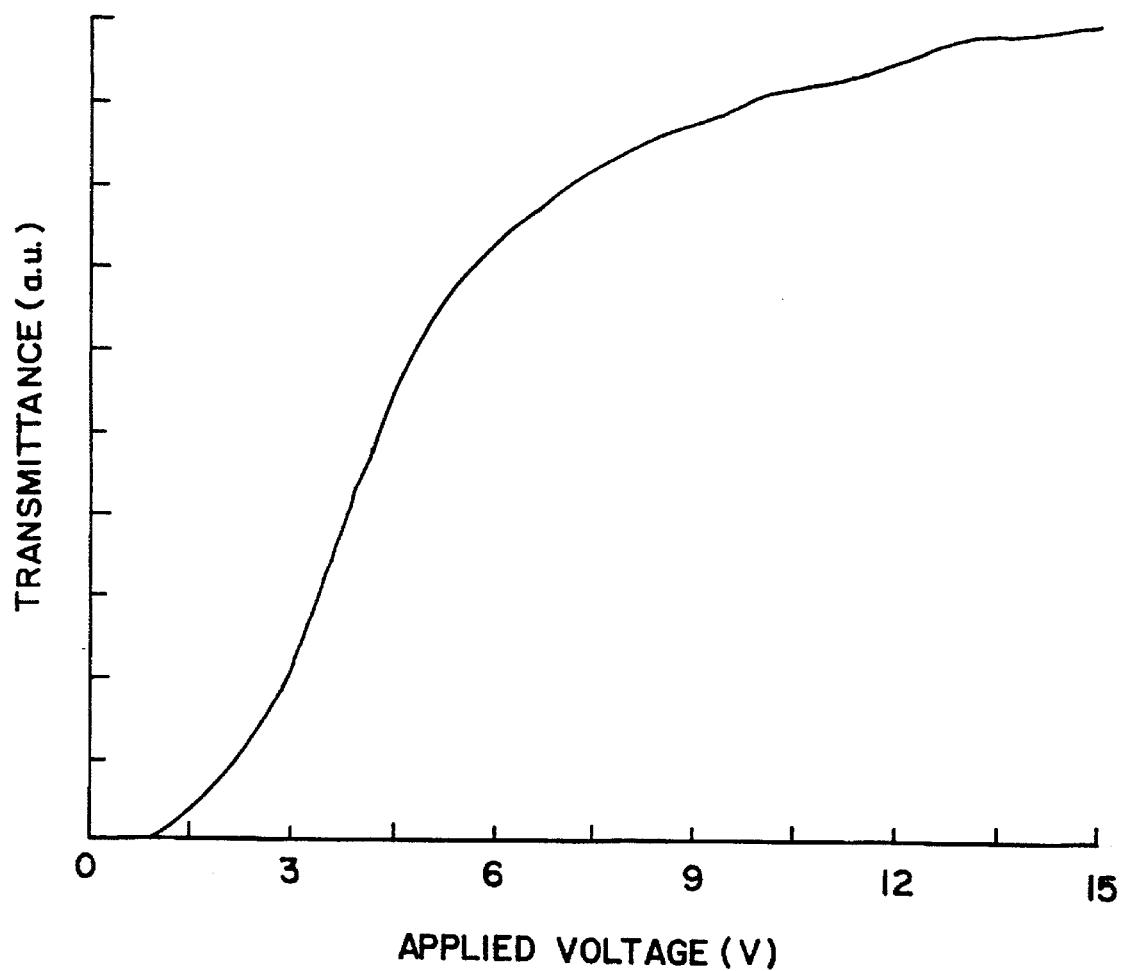
FIG. 7 is a diagram showing the transmittance as a function of the applied voltage for a ferroelectric liquid crystal.
Figure 8:
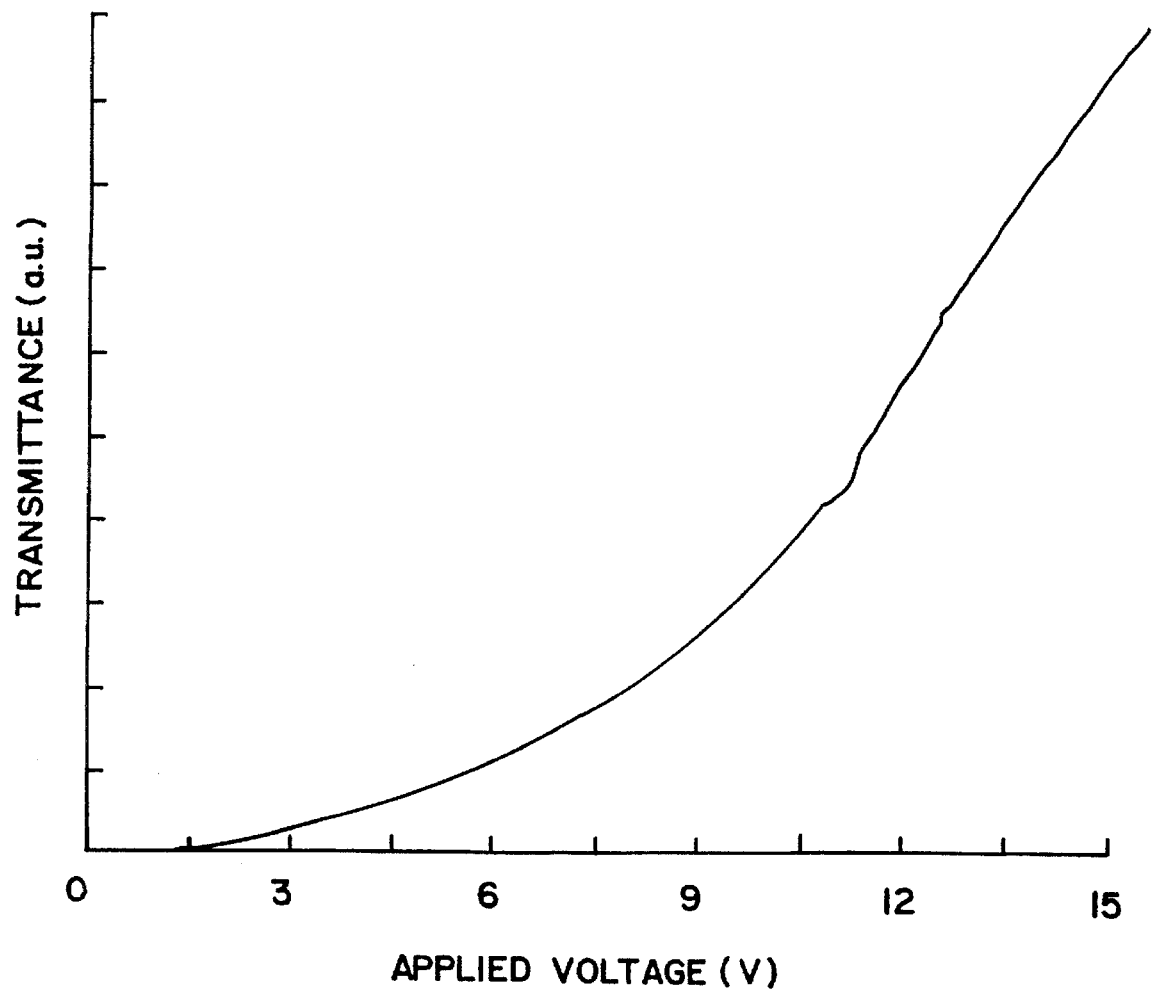
FIG. 8 is a diagram showing the transmittance as a function of the applied voltage for a ferroelectric liquid crystal.
Figure 9:
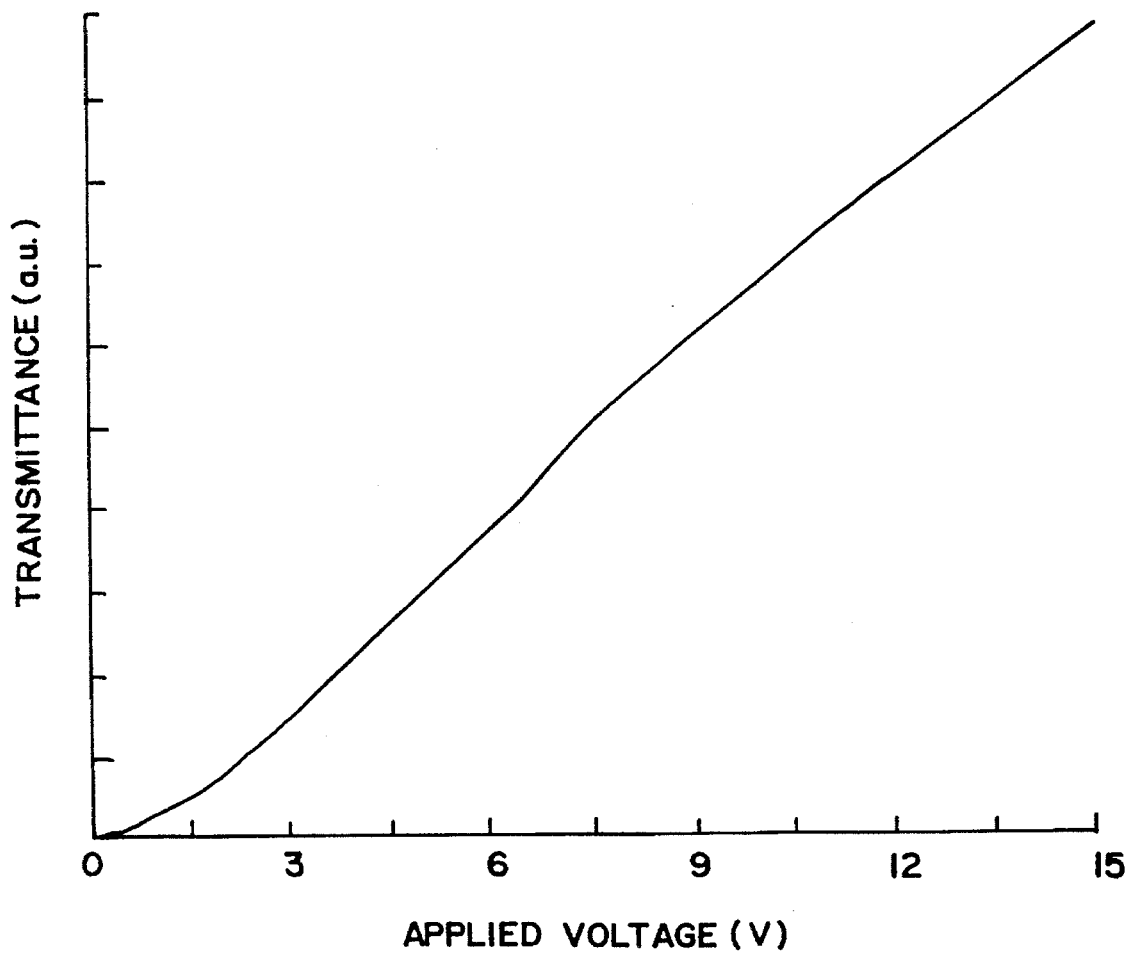
FIG. 9 is a diagram showing the transmittance as a function of the applied voltage for a ferroelectric liquid crystal.
Figure 10:
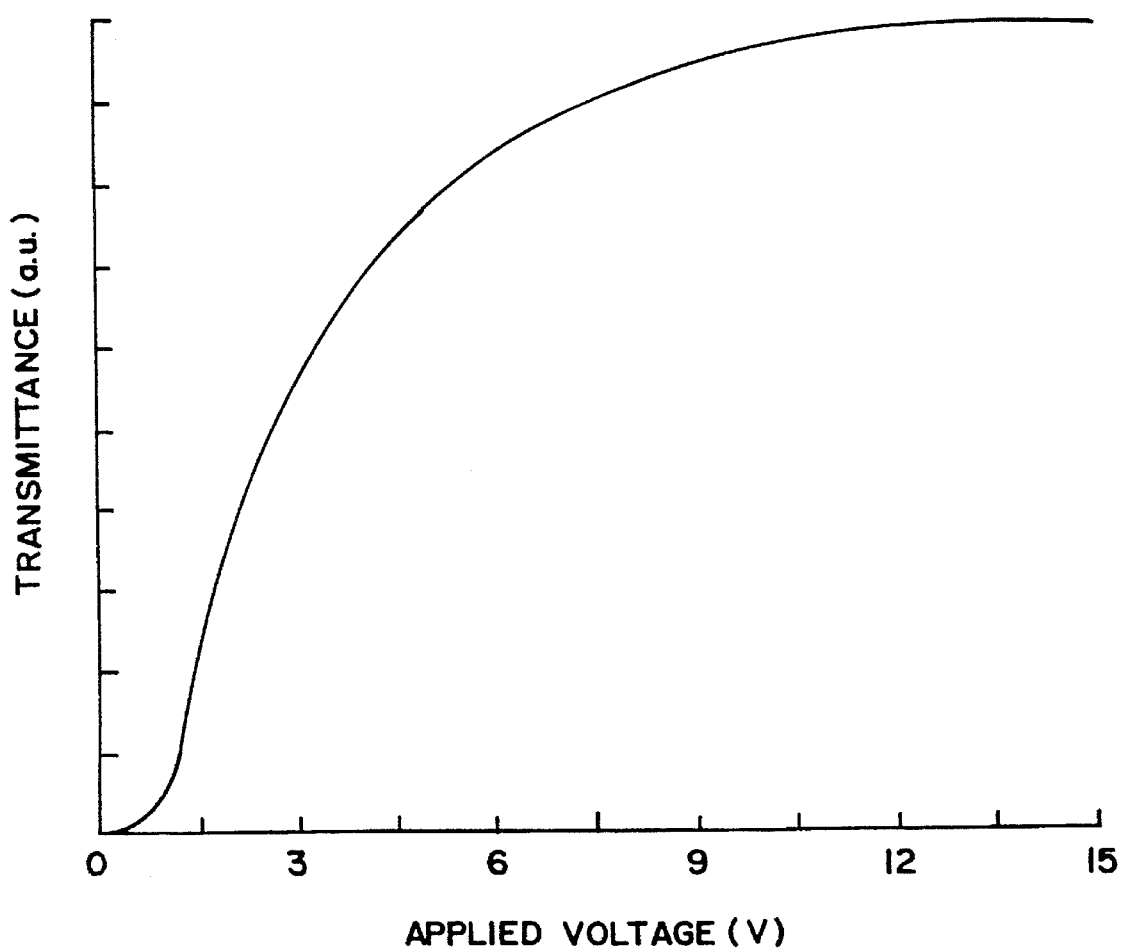
FIG. 10 is a diagram showing the transmittance as a function of the applied voltage for a ferroelectric liquid crystal.
Figure 11:
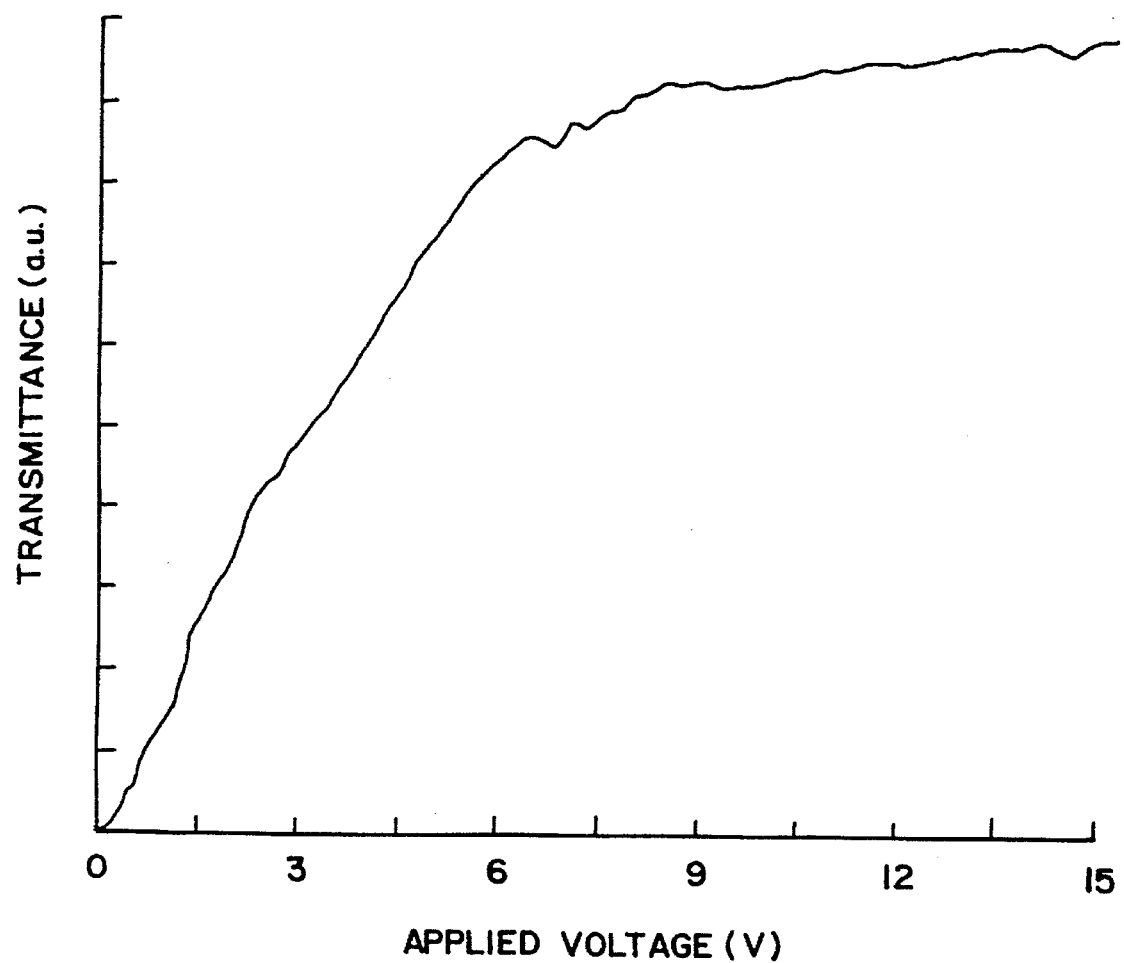
FIG. 11 is a diagram showing the transmittance as a function of the applied voltage for a ferroelectric liquid crystal.
Figure 12:
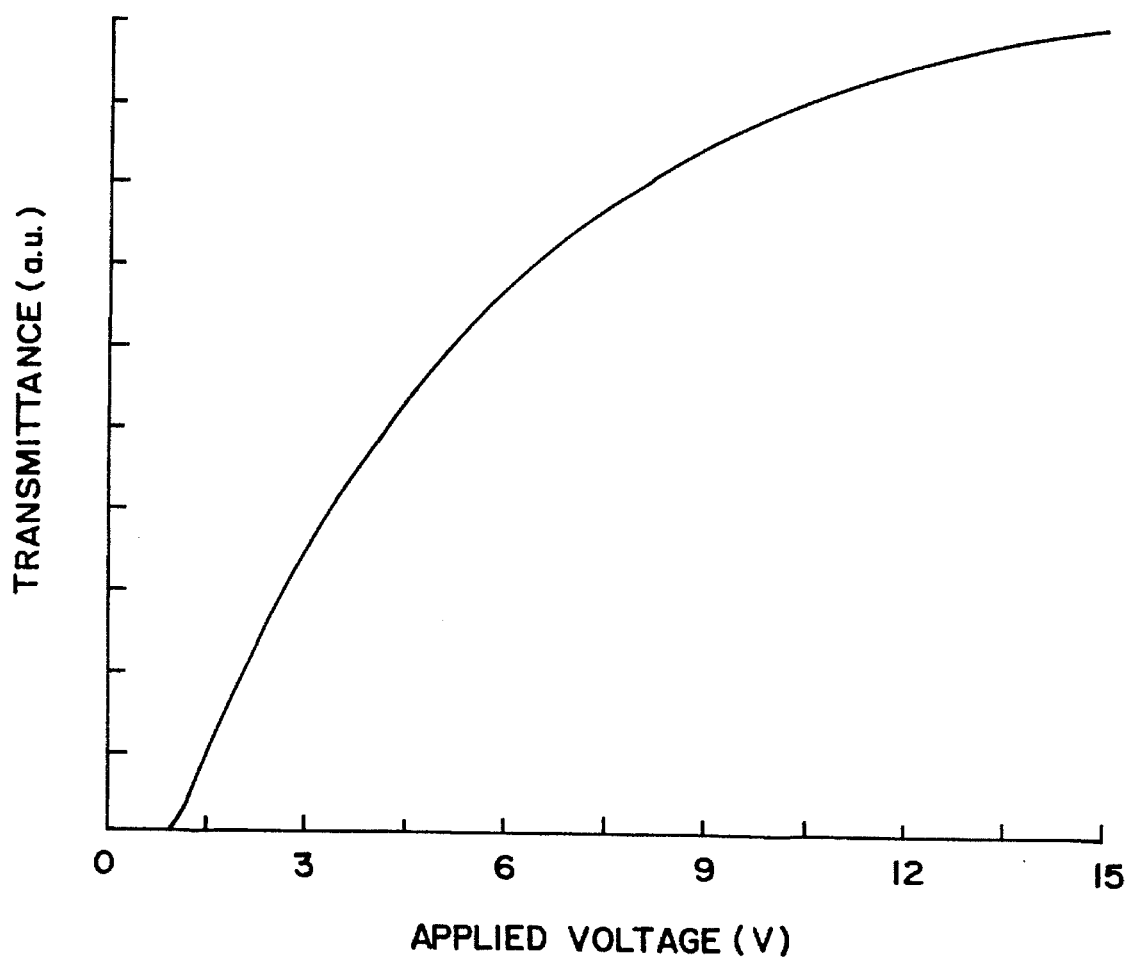
FIG. 12 is a diagram showing the transmittance as a function of the applied voltage for a ferroelectric liquid crystal.
Figure 15:
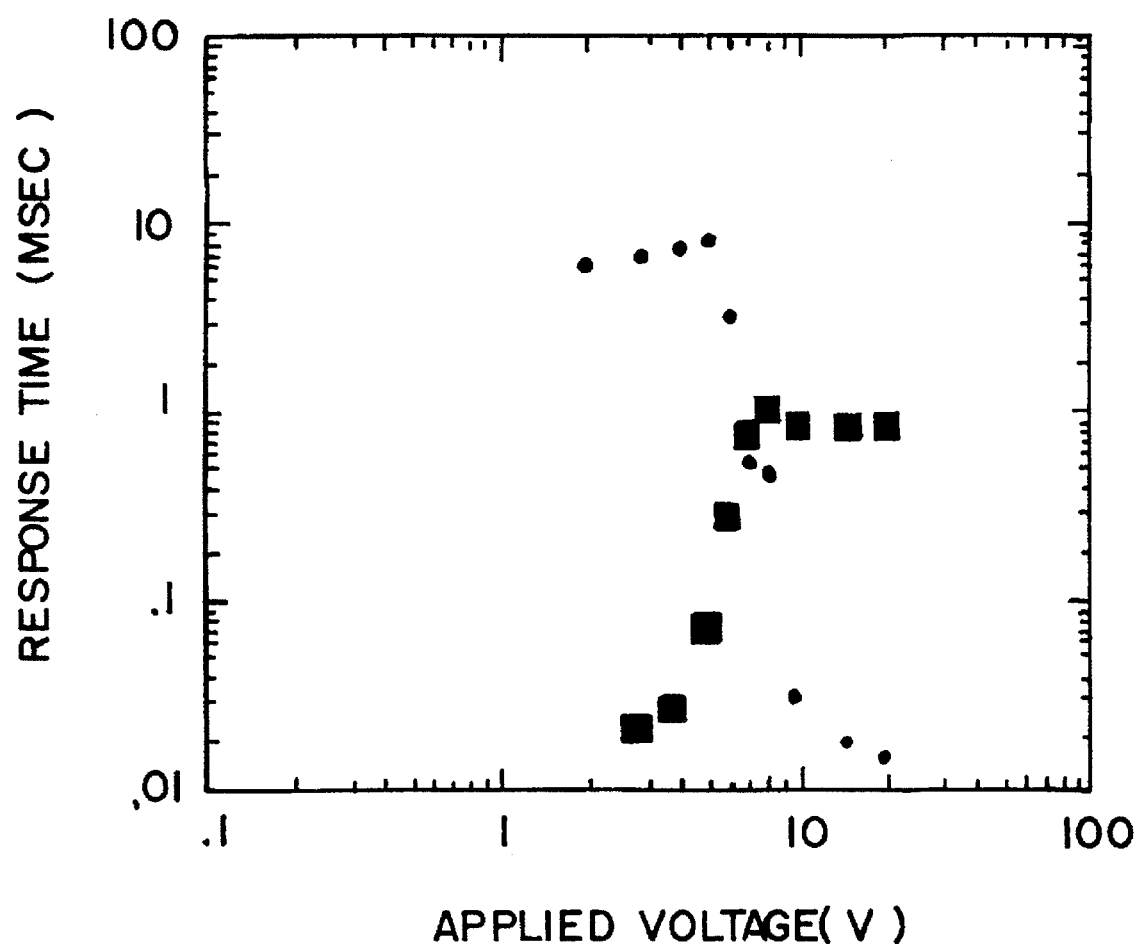
FIG. 15 is a diagram showing the response speed as a function of the applied voltage for a ferroelectric liquid crystal.
Figure 16:
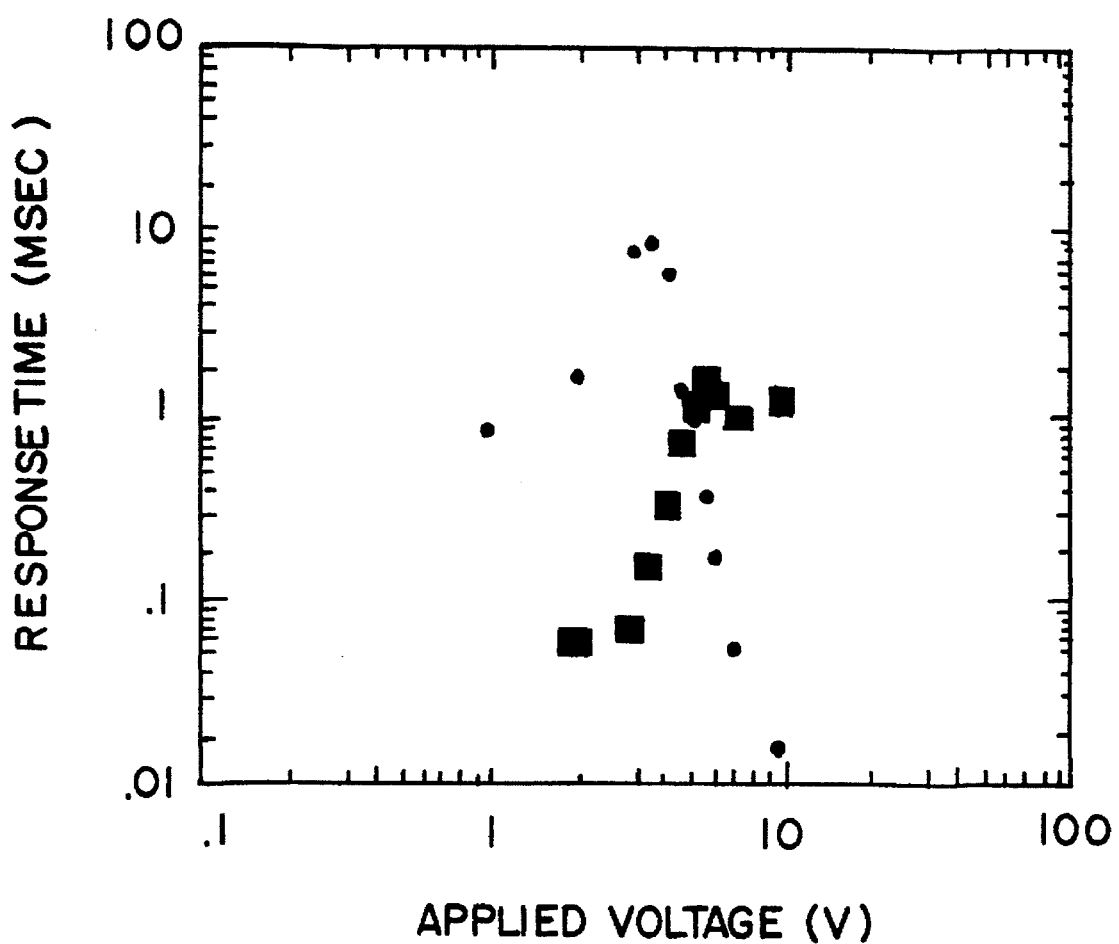
FIG. 16 is a diagram showing the response speed as a function of the applied voltage for a ferroelectric liquid crystal.

| Cell No. | Upper substrate | | Lower substrate | | Rubbing | Liquid crystal | Memory | V-T | Response |
|---|---|---|---|---|---|---|---|---|---|
| | Insulation film | Alignment film | Insulation film | Alignment film | | | | | |
| 3 | o | PSI-A-2101 (Chisso) | o | PSI-A-2101 (Chisso) | Upper only | FLC-6430 (Roche) | Monostable | FIG. 5 | FIG. 15 |
| 4 | o | PSI-A-2101 (Chisso) | o | PSI-A-2101 (Chisso) | Antiparallel | FLC-6430 (Roche) | Monostable | FIG. 6 | FIG. 16 |
| 5 | o | PSI-A-2101 (Chisso) | o | PSI-A-2101 (Chisso) | Parallel | Mixture No. 2 (Table 5~7) | Bistable | FIG. 7 | — |
| 6 | o | PSI-A-2101 (Chisso) | o | PSI-A-2101 (Chisso) | Parallel | Mixture No. 3 (Table 5~7) | Bistable | FIG. 8 | — |
| 7 | o | PSI-A-2101 (Chisso) | o | PSI-A-2101 (Chisso) | Parallel | Mixture No. 4 (Table 5~7) | Bistable | FIG. 9 | — |
| 8 | o | PSI-A-2001 (Chisso) | x | PSI-A-2001 (Chisso) | Parallel | Mixture No. 2 (Table 5~7) | Monostable | FIG. 10 | — |
| 9 | x | LX-1400 (Hitachi chemical) | x | LX-1400 (Hitachi chemical) | Upper only | ZU-5014/000 (Merck) | Bistable | FIG. 11 | — |
| 10 | o | PSI-A-2101 (Chisso) | x | PSI-A-2101 (Chisso) | Upper only | Mixture No. 2 (Table 5~7) | Monostable | FIG. 12 | — |
| 11 | o | PSI-A-2001 (Chisso) | x | PSI-A-2001 (Chisso) | Parallel | Mixture No. 5 (Table 8) | Monostable | — | — |

Table 5 shows the structures and phase transition temperatures for six kinds of compounds (compounds 1 to 6) that form the liquid crystal mixtures 2 to 4 used.

TABLE 5

| Compound No. | Compounds Chemical structure (*indicates asymmetric carbon) | Transition temperature (°C.) | | | | |
|---|---|---|---|---|---|---|
| | | K | SC | SA | N | I |
| Compound 1 | $C_8H_{17}O$—⟨Ph(F)⟩—⟨Ph⟩—$OC_8H_{17}$ | . 50 | (. 42) | — | . 63 | . |
| Compound 2 | $C_{10}H_{21}O$—⟨Ph(F)⟩—⟨Ph⟩—$OC_8H_{17}$ | . 40 | . 52 | 61 | . 65 | . |
| Compound 3 | $C_5H_{11}O$—⟨Ph(F)⟩—⟨Ph(F)⟩—⟨Ph⟩—$C_8H_{17}$ | . 63 | . 93 | . 126 | . 127 | . |
| Compound 4 | $C_8H_{17}O$—⟨Ph(F)⟩—⟨Ph(F)⟩—⟨Ph⟩—$C_8H_{17}$ | . 60 | . 109 | . 128 | — | . |
| Compound 5 | $C_8H_{17}$—⟨Ph⟩—⟨Ph(CN)⟩—$OCH_2$—*CH—*CH—$C_3H_{17}$(S,S), with lactone O=C–O ring | . 86 | — | — | — | . |

TABLE 5-continued

| Compound No. | Compounds Chemical structure (*indicates asymmetric carbon) | Transition temperature (°C.) | | | | |
|---|---|---|---|---|---|---|
| | | K | SC | SA | N | I |
| Compound 6 | C$_6$H$_{13}$—C*HO—⟨○⟩—⟨○⟩—⟨○⟩—C$_8$H$_{17}$(S) with CH$_3$ branch, and F substituents | . 47 | — | — | (. 42) | . |

Table 6 shows the composition of mixtures 2 to 4 represented by the weight percentages of the compounds 1 to 6 shown in Table 5 and the phase transition temperatures for each of the mixtures 2 to 4.

TABLE 6

| Mixture No. | Compound (wt %) | | | | | | Transition temperature (°C.) | | | | |
|---|---|---|---|---|---|---|---|---|---|---|---|
| | 1 | 2 | 3 | 4 | 5 | 6 | K | SC | SA | N | I |
| Mixture 2 | 24.5 | 24.5 | 24.5 | 24.5 | 2.0 | | . <RT | . 66 | . 81 | . 86 | . |
| Mixture 3 | 24.5 | 24.5 | 24.5 | 24.5 | | 2.0 | . <RT | . 69 | . 81 | . 87 | . |
| Mixture 4 | 22.5 | 22.5 | 22.5 | 22.5 | | 10.0 | . <RT | . 67 | . 79 | . 85 | . |

Table 7 shows the amount of spontaneous polarization, tilt angle, memory angle, and response time for each of the mixtures 2 to 4.

TABLE 7

| Mixture No. | Spontaneous polarization (nC/cm$^2$) | Tilt angle θ(°) | Memory angle 2θ(°) | Tesponse time (μsec) |
|---|---|---|---|---|
| Mixture 2 | −1.5 | 24 | 23 | 170 |
| Mixture 3 | <0.5 | 23 | 19 | 147 |
| Mixture 4 | 1.1 | 24 | 20 | 172 |

Table 8 shows the kinds of compounds forming mixture 5, along with the weight percentages of the compounds, the phase transition temperatures, and the amount of spontaneous polarization.

TABLE 8

| Mixture No. | Compounds (wt %) | | Transition temperature (°C.) | | | | | Spontaneous polarization (nC/cm$^2$) |
|---|---|---|---|---|---|---|---|---|
| | SCE-13R (Merck) | SCE-13 (Merck) | K | SC | SA | N | I | |
| Mixture 5 | 90.0 | 10.0 | . <RT | . 60 | . 87 | . 105 | . | 0.7 |

The transmittance was measured for each of these cells while applying a square wave of 60 Hz. The results are shown in FIGS. 5 to 12. As can be seen from any of these figures, the transmittance varies continuously with the applied voltage. In this manner, according to the present invention, continuous gray scales can be achieved with the liquid crystal cells constructed of liquid crystal materials exhibiting ferroelectricity.

It is known that there are two stable modes in ferroelectric liquid crystals, one being the bistable mode first described and the other the monostable mode hereinafter described. Continuous gray scale generation, such as described above, can be achieved with both the bistable and monostable modes. However, when bistable devices and monostable devices are compared, it will be shown that the monostable type devices shows stable properties compared to the bistable type devices, for the following reason.

When using a polarizer with a ferroelectric liquid crystal display device, the polarization axis of the polarizer is aligned with the orienting direction of the liquid crystal molecules in a stable state when no electric field is applied. This is the same for both monostable and bistable devices. For bistable devices, the polarization axis is aligned with the molecular orientation in either of the two stable states. In the case of bistable devices, however, the following problems occur.

(1) When the device is left for a long period without the application of an electric field, a region occurs in the liquid crystal layer that tends to shift to the other stable state. This causes the darkest area in the display to gradually become lighter, leading to instability of the display.

(2) Since there are two stable states, light transmission differs, depending on which stable state the molecules return to when the applied electric field is removed.

The above point (1) does not present much of a problem for the liquid crystal display device of the invention that is designed to refresh the display continually. On the other hand, the above point (2) poses a serious problem. This problem will be described in further detail below.

In the liquid crystal display device of the invention constructed with a ferroelectric liquid crystal, when switching the display from the brightest state, an image display state, to the darkest state (or from the darkest state to the brightest state), the voltage being applied to the liquid crystal is set to 0 V.

In the case of a bistable device, when the voltage being applied to the liquid crystal becomes 0 V, the liquid crystal molecules are put in either of the two stable states, 901 or 901', as shown in FIGS. 2A and 2B. At this time, if the liquid crystal is put in the stable state 901', the darkest state is attained as desired. On the other hand, if it is put in the state 901, the display is switched to the brightest state when the darkest state is desired. When the voltage becomes 0 V, whether the molecular orientation in the liquid crystal layer assumes state 901 or 901' is determined by the polarity and magnitude of the voltage being applied to the liquid crystal immediately before it becomes 0 V.

Figure 2C:
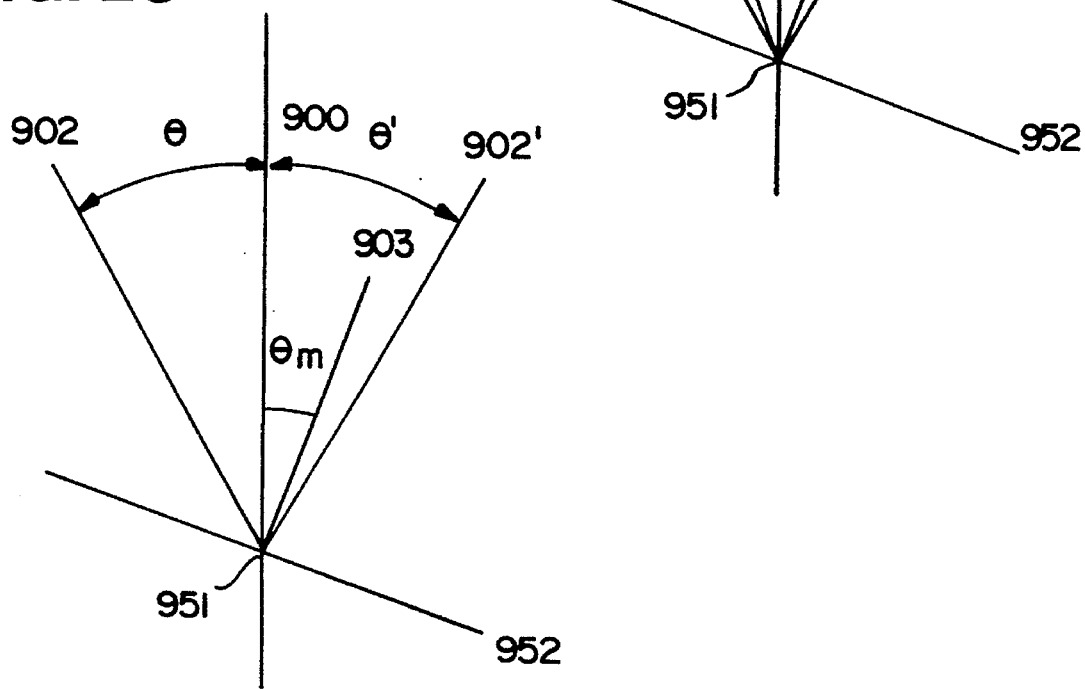

On the other hand, in the case of a monostable device, the molecular orientation has only one stable state 903, as shown in FIG. 2C. That is, when the voltage applied to the liquid crystal becomes 0 V, the liquid crystal molecules can take only one stable state 903. Accordingly, the polarization direction of the polarizer should only be aligned parallel to the direction of 903.

FIGS. 13A and 13B show the variation of transmitted light intensity with applied voltage for monostable and bistable devices, respectively. In the monostable device, when the applied voltage becomes 0 V, the darkest state is attained, as shown in FIG. 13A, regardless of the polarity, positive or negative, of the immediately preceding voltage.

In the bistable device, on the other hand, when the applied voltage is set to 0 V after application of a negative voltage, the darkest state is obtained, but when the applied voltage is set to 0 V after application of a positive voltage, the darkest state is not attained, as shown in FIG. 13B. This is because when the immediately preceding voltage is negative, the liquid crystal molecules are oriented in the direction of 901' in FIG. 2B (in alignment with the polarization direction 951 of the polarizer), whereas when the immediately preceding voltage is positive, the liquid crystal molecules are oriented in the direction of 901 in FIG. 2B, so that the orienting direction of the liquid crystal molecules goes out of alignment with the polarizing direction 951 of the polarizer. For this reason, the monostable type has practical advantages over the bistable type.

Referring now to the column of memory effect of ferroelectric liquid crystal molecules in Table 4 that summarizes the experimental conditions and results of the foregoing examples, it can be seen that in any monostable device, the two substrates are made asymmetric to each other in terms of rubbing treatment or in terms of the presence or absence of an insulating film on the respective substrates. For example, for cells Nos. 2 and 3, only one substrate is treated with rubbing, while for cell No. 4, both substrates are treated with rubbing, but the rubbing directions are antiparallel to each other. For cells Nos. 8 and 11, only one substrate is provided with an insulating film. For cell No. 10, rubbing treatment is performed on one substrate only, and also, the insulating film is formed on one substrate only. Thus, the inventors of the present application verified by experiment that the asymmetry between the two substrates in terms of alignment treatment or in terms of the provision of an insulating film is effective in realizing monostable ferroelectric liquid crystals.

It will be noted that in addition to the rubbing treatment, oblique evaporation is also an effective alignment treatment technique in the fabrication of ferroelectric liquid crystal display devices according to the present invention.

When only one substrate is to be treated with rubbing to realize the monostable mode of ferroelectric liquid crystal layer, it is preferable that of the two substrates, the substrate on which no active elements are formed be treated with rubbing. This is because the static electricity generated by rubbing may cause the transistor or other element characteristics to change or may lead to insulation breakdown between interconnections.

In SID 90 Digest, 106 (1990), a ferroelectric liquid crystal cell is disclosed which, unlike the above-described SSFLC cell (surface stabilized ferroelectric liquid crystal cell), has a helical pitch substantially shorter than the cell thickness and yet has the effect of suppressing the helical structure, thus exhibiting bistability. This cell is called a short-pitch bistable ferroelectric liquid crystal (SBFLC) cell, in contrast with the SSFLC cell. This short-pitch ferroelectric liquid crystal mode has the following advantages.

(1) In the conventional ferroelectric liquid crystal mode, the spontaneous polarization needs to be made large if the response speed is to be increased. Making the spontaneous polarization larger, however, has the tendency to make the helical pitch shorter. Therefore, the gap between the substrates needs to be reduced so that the helix can be suppressed. Reducing the substrate gap, however, makes the fabrication of liquid crystal cells difficult, leading to reduced fabrication yield.

On the other hand, in the short-pitch ferroelectric liquid crystal mode, a helix-suppressed state can be achieved without reducing the substrate gap. Therefore, the above-stated difficulty will not occur even if the spontaneous polarization is made large to increase the response speed.

(2) In the conventional ferroelectric liquid crystal mode, the characteristics such as response time and memory angle are strongly dependent on temperature, requiring temperature control of the liquid crystal panel. On the other hand, in the short-pitch ferroelectric liquid crystal mode, the temperature dependence of these characteristics is small.

Furthermore, though this does not directly affect the display performance, the conventional ferroelectric liquid crystal mode has a problem in impact resistance. Therefore, a shock absorber or the like has to be provided to protect the liquid crystal panel from impact. This has posed a big barrier to the reduction of size of the display device. In comparison, the short-pitch liquid crystal mode provides excellent impact resistance, which eliminates the need for a shock absorber and other items which have no relevance to the display performance.

The reason has not yet been determined why, in the short-pitch ferroelectric liquid crystal, the helical structure can be suppressed despite the helical pitch being smaller than the cell thickness. The ferroelectric liquid crystal material FLC-6430 from Hoffman-LaRoche, described in the aforementioned paper and used in some of the examples of the invention, is the only example of SBFLC cell currently known. Cell Nos. 2 to 4 shown in Table 4 are constructed using this liquid crystal material.

Example 4

In Example 4, the relationship between applied voltage and response time for various ferroelectric liquid crystals was examined. The voltage waveform shown in FIG. 13 was applied to each of the ferroelectric liquid crystal cells of cell Nos. 2 to 4 in Table 4. The response time was measured based on the change in the transmittance observed at this time. Here, the response time means how fast the transmitted light intensity changes (from 10% to 90% or from 90% to 10%) in response to a positive pulse voltage. The results are shown in FIGS. 14 to 16. In the figures, each solid black dot indicates the time required to change from the dark to the light state (the rise time) and each black square indicates the time required to change from the light to the dark state (the fall time).

The invention aims to achieve a frame display time of 11 milliseconds or less. To achieve this, the time allowed for writing must be sufficiently shorter than 11 milliseconds. In fact, it is desirable that the response time be kept under 1 millisecond.

FIG. 14 shows that response times of about 1 millisecond can be achieved when the applied voltage is 1 V. Similarly, it is shown that response times of 1 millisecond or less can be obtained with an applied voltage of 10 V or larger in the case of FIG. 15, and 7 V or larger in the case of FIG. 16. Thus, by using ferroelectric liquid crystals as the liquid crystal material, response times within 1 millisecond can be achieved.

The above experiment was conducted with the liquid crystals in a chiral smectic C phase, but it was also confirmed that similar results could be obtained with ferroelectric liquid crystals in other phases such as a chiral smectic F phase, a chiral smectic I phase, etc.

In the present invention, in order to obtain switching elements having high operating speeds enough to implement the field sequential color system, switching transistors for driving pixel electrodes are formed in single-crystalline silicon. Since single-crystalline silicon has a high mobility (approx. 1500 cm$^2$ V$^{-1}$ s$^{-1}$), TFTs can be obtained that have performance far superior to the amorphous silicon TFTs or polysilicon TFTs given in the description of the prior art. Table 9 shows a comparison of performance among the various categories of transistors.

TABLE 9

| | Single-crystalline Si | Poly-crystalline Si | Amorphous Si |
|---|---|---|---|
| Mobility (cm$^2 \cdot$ v$^{-1} \cdot$ s$^{-1}$) | | | |
| Electron | 1500 | 100 | 0.1–0.5 |
| Hole | 600 | 50 | — |
| Ion/Ioff | >10$^3$ | 10$^7$ | 10$^6$ |
| Operation frequency (CMOS shift register) | Several GHz (1 μm rule) | 20 MHz (L = 10 μm) (W = 30 μm) | 5 MHz (L = 10 μm) (W = 30 μm) |

From Table 9, it can be seen that transistors formed in single-crystalline silicon provide switching elements having greater current-driving capabilities and larger current on/off ratios.

As described above, a ferroelectric liquid crystal is used as the liquid crystal material to achieve fast response as well as gray scale generation, and switching transistors formed in single-crystalline silicon layers provide switching elements capable of high speed operations. These solve some of the problems associated with the implementation of a color display based on the field sequential system. A remaining problem concerns the stability of LCD signal retention. The following describes how this problem can be solved.

Figure 17A:
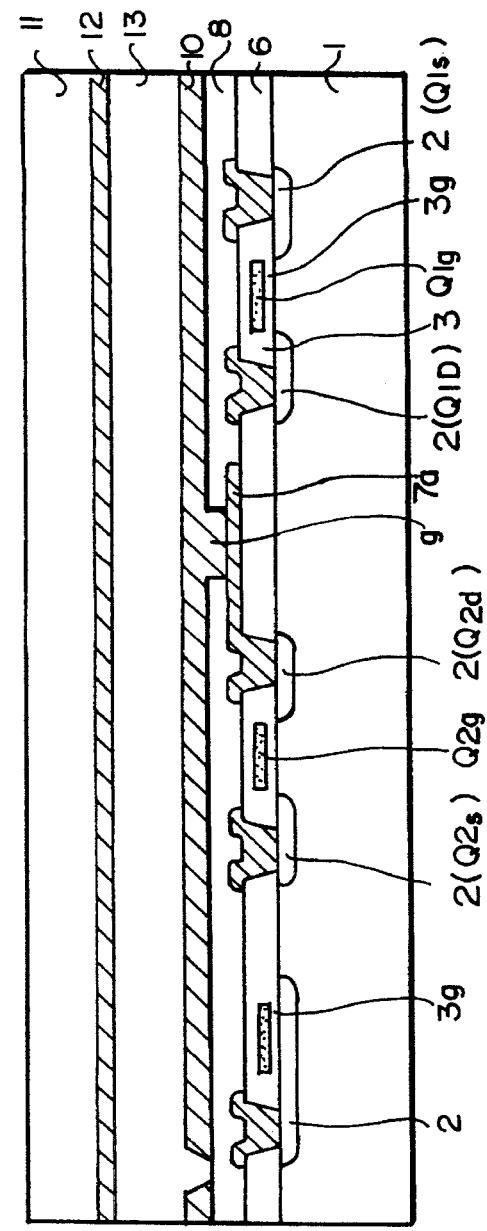
FIGS. 17A and 17B are a cross-sectional view and a plan view of a unit pixel area in a liquid crystal display device according to an example of the present invention.
Figure 17B:
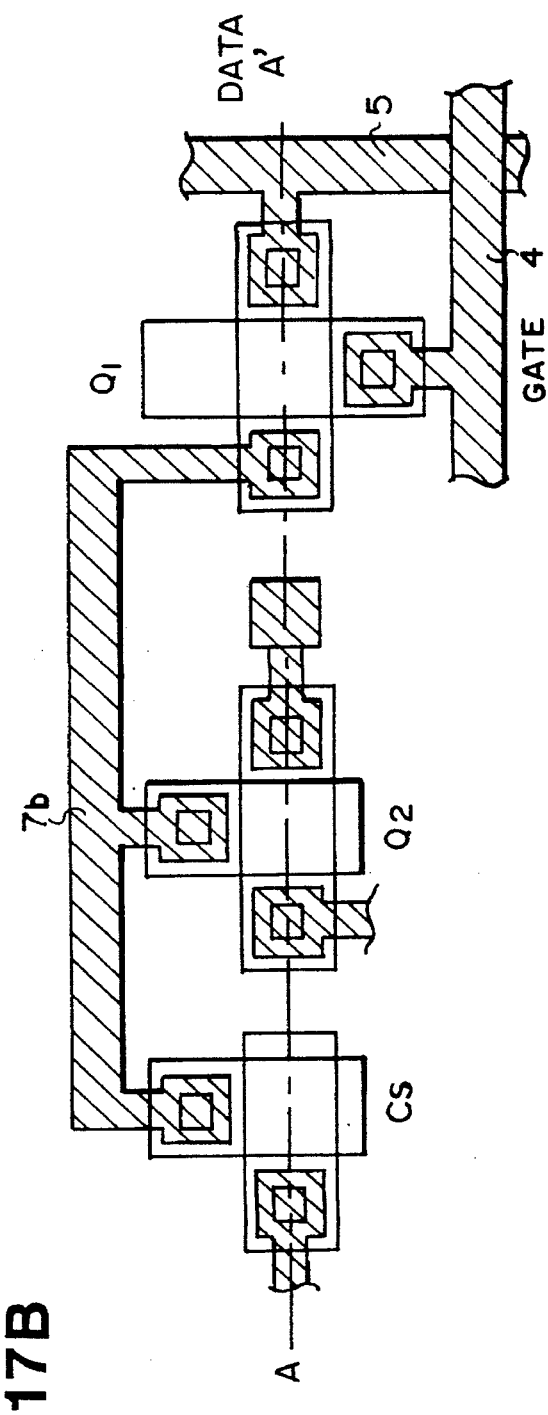

FIGS. 17A and 17B show the circuit configuration of one unit pixel area in a liquid crystal color display device according to the present example. FIG. 17B is a plan view, and FIG. 17A is a cross-sectional view taken along line A–A' in FIG. 17B. As shown in FIG. 17A, this liquid crystal display device uses p-type single-crystalline silicon to form a base substrate 1, on top of which an NMOS switching circuit is formed. The display device uses two transistors, a first transistor Q1 and a second transistor Q2, for every one unit pixel area. Sources Q1$s$ and Q2$s$ and drains Q1$d$ and Q2$d$ of the respective transistors Q1 and Q2 are formed as n-type diffusion layers 2 diffused into the p-type single-crystalline silicon layer. Gate electrodes Q1$g$ and Q2$g$ of the respective transistors Q1 and Q2 are formed above the silicon layer of the base substrate 1 between the respective sources Q1$s$ and Q2$s$ and drains Q1$d$ and Q2$d$, and each of the gate electrodes Q1$g$ and Q2$g$ is entirely surrounded by an insulating film 3. In this example, the gate electrodes Q1$g$ and Q2$g$ are formed of polysilicon, and gate insulating films 3 g are silicon oxide films. The gate electrodes Q1$g$ and Q2$g$ of the transistors Q1 and Q2 are separated by a silicon oxide film 6 and a polysilicon electrode 7$a$ on the base substrate 1. In the unit pixel area, a storage capacitor Cs is formed along with the two transistors Q1 and Q2. This storage capacitor Cs is formed from an aluminum line 7$b$ formed in the silicon oxide film 6 adjacent to the second transistor Q2, an n-type diffusion layer 2 formed in the silicon layer in the corresponding position, and a gate insulating film 3$g$ formed between them.

A protective film 8 is formed over the entire surface of the base substrate 1 and covering the gate insulating film 3$g$, insulating film 3 (containing each gate electrode), silicon oxide film 6, polysilicon electrode 7$a$, and aluminum line 7$b$. The protective film 8 is provided to protect the circuit formed on the base substrate 1.

A throughhole 9 is opened in the protective film 8 in a position where the polysilicon electrode 7$a$ formed between the transistor Q2 and the silicon oxide film 6 adjacent to the transistor Q2 spreads over the silicon oxide film 6. A pixel electrode 10 is formed over a designated region of the protective film 8 in each unit pixel area. The pixel electrode 10 is connected via the throughhole 9 to the underlying polysilicon electrode 7$a$ which in turn is electrically connected to the drain Q2$d$ of the transistor Q2.

Further, as shown in FIG. 17B, the gate electrode Q1$g$ of the first transistor Q1 is connected to a scanning line 4, while the source electrode Q1$s$ of the first transistor Q1 is connected to a signal line 5 which intersects the scanning line 4. The drain electrode Q1$d$ of the first transistor Q1, the gate electrode Q2$g$ of the second transistor Q2, and the polysilicon electrode 7$a$ associated with the storage capacitor Cs are connected to the common aluminum line 7$b$ formed on the silicon oxide film 6.

A transparent counter electrode 12 is formed over the entire area of the surface of a glass substrate 11 that faces the base substrate 1. An alignment film (not shown) is formed over the counter electrode 12.

The glass substrate 11 and the base substrate 1 are held opposite each other, and a ferroelectric liquid crystal layer 13 is sealed between the two substrates 1 and 11. The glass substrate 11 is placed on the light incident side. (See Table 4 for materials of the liquid crystal layer 13, alignment films, and other details.)

Figure 18:
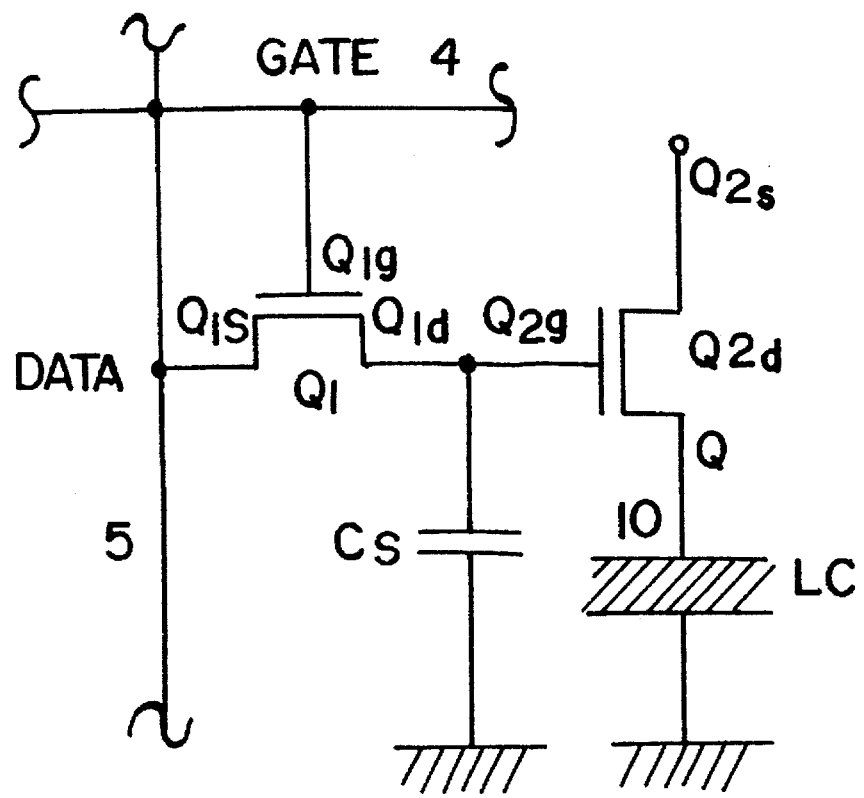
FIG. 18 is an equivalent circuit diagram of a liquid crystal driving circuit for a unit pixel area in the liquid crystal display device according to the present invention.
Figure 19:
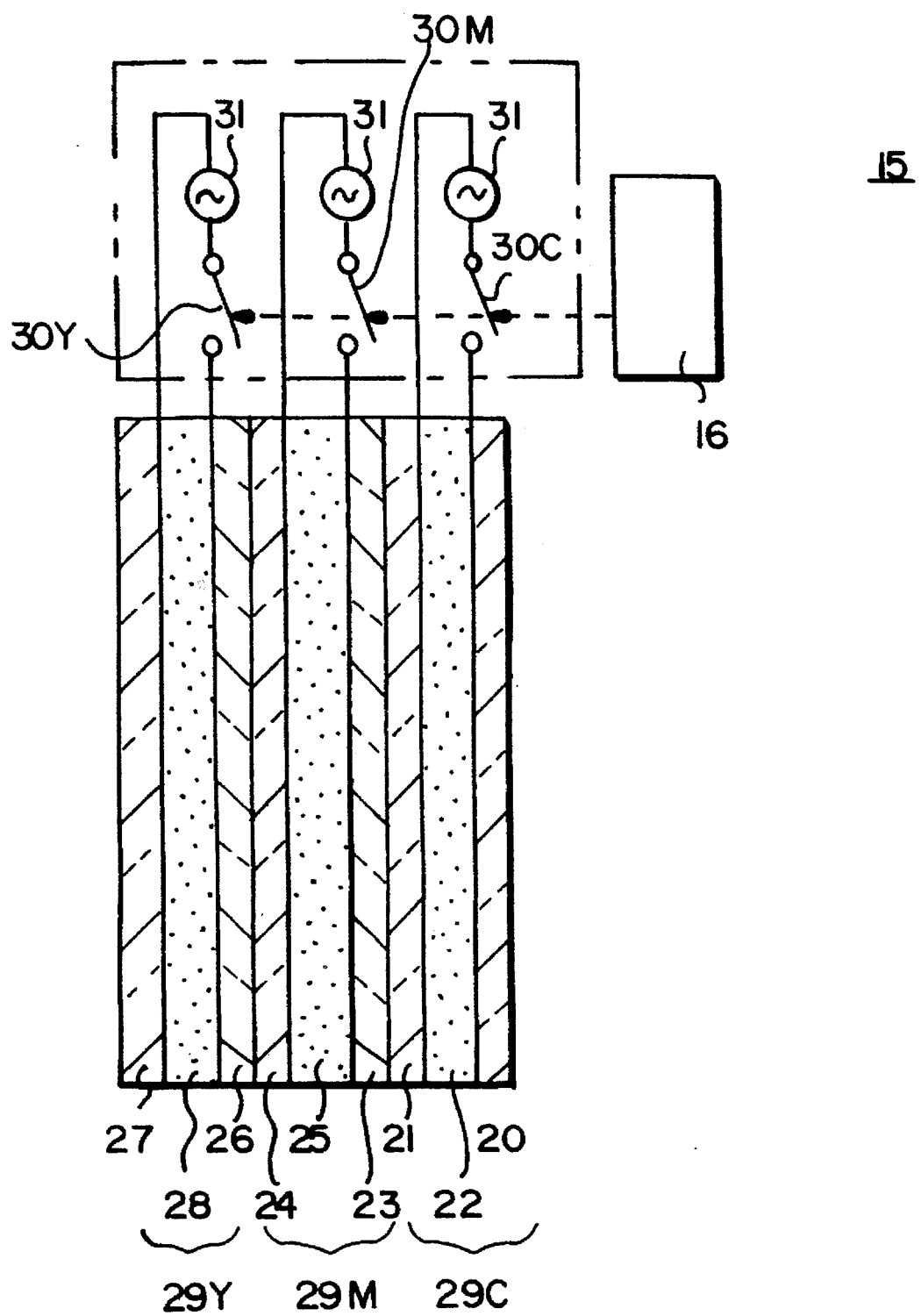
FIG. 19 is a diagram showing a color filter for high-speed sequential switching of colors.
Figure 20:
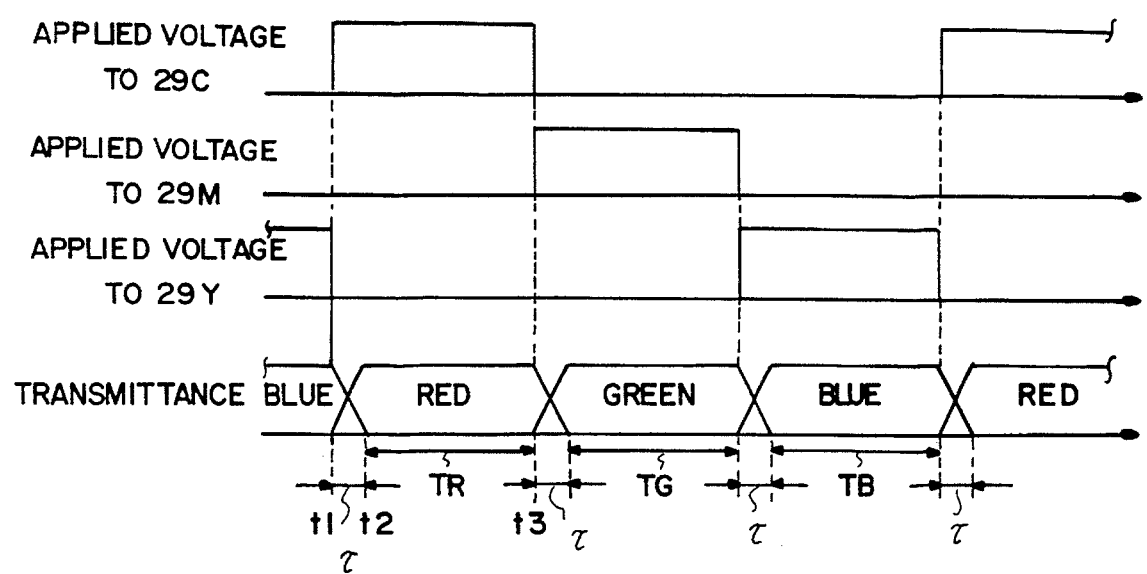
FIG. 20 is a timing chart for explaining the basic operation of a color shutter.
Figure 21:
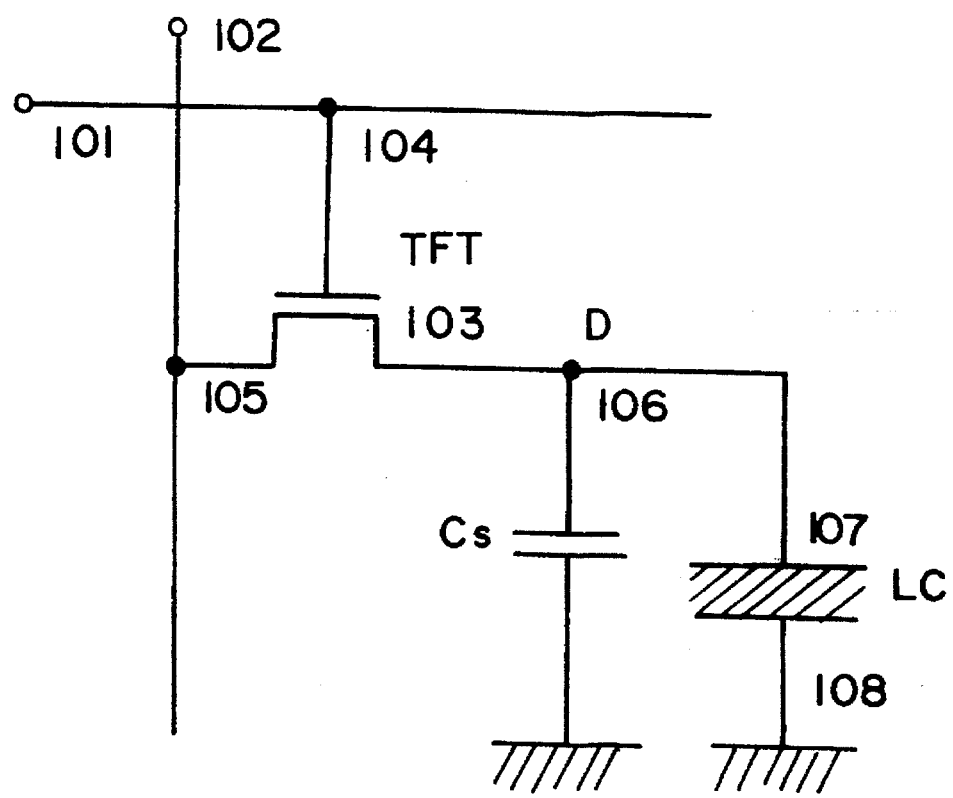
FIG. 21 is an equivalent circuit of a driving circuit for an active-matrix liquid crystal display device according to the prior art.

We will now describe a driving circuit for the liquid crystal display device and a method for driving the same according to the present example. FIG. 18 shows an equivalent circuit of the liquid crystal driving switching circuit of the present example shown in FIG. 17. The circuit shown in FIG. 18 illustrates the configuration of one unit pixel area.

The first transistor Q1 is connected to the scanning line 4 and signal line 5 near the intersection of these two lines. More specifically, the gate Q1g of the first transistor Q1 is connected to the scanning line 4, and the source Q1s of the first transistor Q1 is connected to the signal line 5. The drain Q1d of the first transistor Q1 is connected to one electrode of the storage capacitor Cs and also to the gate Q2g of the second transistor Q2. The other electrode of the storage capacitor Cs is grounded. On the other hand, the source Q2s of the second transistor Q2 is connected to a power supply, and the drain Q2d of the second transistor Q2 is connected to the pixel electrode 10.

The second transistor Q2 has the characteristic that the potential of the drain Q2d varies substantially linearly with the potential of the gate Q2g. Since the first transistor Q1 functions to supply a data signal to the second transistor Q2, the off leakage current must be kept as small as possible. The storage capacitor Cs has the function of holding the data signal from the first transistor Q1. The second transistor Q2 is used to apply a voltage to the liquid crystal LC. Since the voltage is applied directly to the liquid crystal LC, the second transistor Q2 is required to sustain the voltage needed for switching the liquid crystal LC.

This circuit is driven in the following manner. First, when a data signal is input onto the signal line 5, and a scanning signal is applied to the scanning line 4 on scan line 1, the first transistor Q1 in each pixel electrode connected to the scanning line 4 is turned on, and the data signal is applied sequentially to the first transistors Q1 connected to the scanning line 4, the data signal being stored on each associated storage capacitor Cs. Since the second transistor Q2 has the characteristic of being able to control the supply voltage in linear relationship with the scanning signal voltage, a data signal voltage corresponding to the scanning line voltage is applied to the liquid crystal LC. Here, the voltage applied to the liquid crystal LC is controlled by the voltage retained on the storage capacitor Cs; since this voltage is retained until the next field, a constant voltage continues to be applied to the liquid crystal LC. After the first transistor Q1 is turned off, the second transistor Q2 remains in the on state until the first transistor Q1 is turned on again. Accordingly, the second transistor Q2 continues to apply the voltage, corresponding to the data signal voltage from the storage capacitor Cs, to the liquid crystal LC.

In the present invention, ferroelectric liquid crystal is used for the liquid crystal LC. As previously described, ferroelectric liquid crystal materials exhibit spontaneous polarization. When a voltage is applied to a liquid crystal LC having a large spontaneous polarization, a transient current flows due to a change in the orientation of the liquid crystal LC, In the case of ferroelectric liquid crystal, the change of the orientation takes several tens of microseconds, during which time the transient current flows. As for the time required to write data to the scanning lines 4, if a total of 1125 scanning lines 4 are to be scanned in 1/30 second, the scanning time per line is about 30 microseconds. To implement the field sequential color system, the write time needs to be shortened to one-third of that time, which means the write time allowed for one scanning line 4 is about 10 microseconds. Since the transient current flows for a period longer than the write time, proper display cannot be produced by a conventional line sequential method since the voltage being applied to the liquid crystal LC varies due to the transient current that flows after the write period.

However, according to the configuration of the driving circuit and the driving method for the present invention, a constant voltage continues to be applied to the liquid crystal LC (ferroelectric liquid crystal) beyond the write period, as explained above. This prevents voltage variations due to the transient current, so that proper display can be produced.

After the scanning signal has been written to the scanning line 4 on scan line 1, the scanning signal is turned off, and the scanning signal is now applied to the scanning line 4 on scan line 2, to write a data signal to each pixel connected to the scanning line 4 on line 2. When data write is complete on the scanning line 4 on scan line 2, the write operation next proceeds to the scanning line 4 on scan line 3. In this manner, data is written across the entire display area, to complete the display of one field.

In the above illustrated example, the circuit is constructed using two transistors and one storage capacitor, but a circuit of any appropriate configuration may be used as long as the circuit has similar functions to those provided by the above-described circuit.

According to the invention, color display based on the field sequential color system can be realized. As a result, the invention is effective in achieving a super high-resolution, single-plate, full color liquid crystal display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising: a first substrate having a single-crystalline silicon layer on one surface thereof; a transparent second substrate disposed opposite the first substrate, the surface of the first substrate having the single-crystalline silicon layer thereon facing the second substrate with a ferroelectric liquid crystal layer sandwiched therebetween; and a plurality of circuit elements formed in the single-crystalline silicon layer in a corresponding relationship to each of a plurality of pixel areas formed on the surface of the first substrate which faces the ferroelectric liquid crystal layer; wherein the liquid crystal display device performs field sequential color display based on successive additive color mixing to obtain desired color at each pixel area.

2. The liquid crystal device recited in claim 1, wherein circuit elements for each pixel area include first and second transistors and a storage capacitor, a source or drain of the first transistor being connected to a gate of the second transistor and to the storage capacitor, and the second transistor being connected to supply a voltage to the pixel area.

3. A liquid crystal color display device that performs field sequential color display, comprising:

a color filter panel that permits high speed sequential switching of colors using a plurality of different color filters formed one on top of the other, where each color filter includes:

a first substrate having a single-crystalline silicon layer on one surface thereof; and a transparent second substrate disposed opposite the first substrate, the surface of the first substrate having the single-crystalline silicon layer thereon facing the second substrate with a ferroelectric liquid crystal layer, including ferroelectric liquid crystal combined with a color dye, sandwiched therebetween; and a plurality of circuit elements formed in the single-crystalline silicon layer in a corresponding relationship to each of a plurality of pixel areas formed on the surface of the first substrate which faces the ferroelectric liquid crystal layer, and switching circuitry for selectively applying voltage to each of the color filters to sequentially generate light beams of different colors at each pixel area within one display frame time period.

4. The liquid crystal color display of claim 3, wherein the different colors include three primary colors red, green, and blue, the display frame time period is 1/30 second, and the switching circuitry displays images in each of the red, green, and blue colors at a frequency of 90 Hz so that each image is displayed in about 11 milliseconds or less.

5. A liquid crystal color display device as recited in claim 3, wherein circuit elements for each pixel area include first and second transistors and a storage capacitor, a source or drain of the first transistor being connected to a gate of the second transistor and to the storage capacitor, and the second transistor being connected to supply a voltage to the pixel area.

* * * * *